United States Patent
Hieda et al.

[11] Patent Number: 5,691,821
[45] Date of Patent: Nov. 25, 1997

[54] A/D CONVERTING APPARATUS AND IMAGE SENSING APPARATUS

[75] Inventors: Teruo Hieda; Kousuke Nobuoka, both of Yokohama, Japan

[73] Assignee: Canon Kabushiki Kaisha, Tokyo, Japan

[21] Appl. No.: 160,234

[22] Filed: Dec. 2, 1993

[30] Foreign Application Priority Data

| Dec. 4, 1992 | [JP] | Japan | 4-350712 |
| Dec. 22, 1992 | [JP] | Japan | 4-356698 |
| Dec. 25, 1992 | [JP] | Japan | 4-358969 |

[51] Int. Cl.$^6$ .................... H04N 1/40; H03M 1/20
[52] U.S. Cl. .................... 358/445; 358/456; 358/518; 341/120; 341/131; 348/674
[58] Field of Search .................... 341/131, 139; 348/572, 574, 254, 607, 674, 675, 679; 358/463, 464, 465, 466, 445, 519, 520, 518, 534

[56] References Cited

U.S. PATENT DOCUMENTS

| 4,901,152 | 2/1990 | Hidea et al. | |
| 4,912,470 | 3/1990 | Hosotani | 341/159 |
| 5,001,556 | 3/1991 | Nakamura | 358/98 |
| 5,103,299 | 4/1992 | Asaida | 358/37 |
| 5,157,498 | 10/1992 | Suga et al. | 358/209 |
| 5,221,963 | 6/1993 | Hashimoto et al. | 358/209 |
| 5,394,250 | 2/1995 | Shono | 358/455 |
| 5,457,494 | 10/1995 | Suga | 348/229 |

*Primary Examiner*—Edward L. Coles, Sr.
*Assistant Examiner*—Madeleine Av Nguyen
*Attorney, Agent, or Firm*—Fitzpatrick, Cella, Harper & Scinto

[57] ABSTRACT

A low-cost A/D converting apparatus having a high precision includes a first A/D converter to which an analog input signal is applied as an input, a plurality of D/A converters to which an output from the first A/D converter is applied as an input, a subtractor for subtracting at least one output of outputs of the plurality of D/A converters from the analog input signal, and a second A/D converter, to which an output from the subtractor is applied as an input, having a resolution higher than a resolution of the first A/D converter.

6 Claims, 39 Drawing Sheets

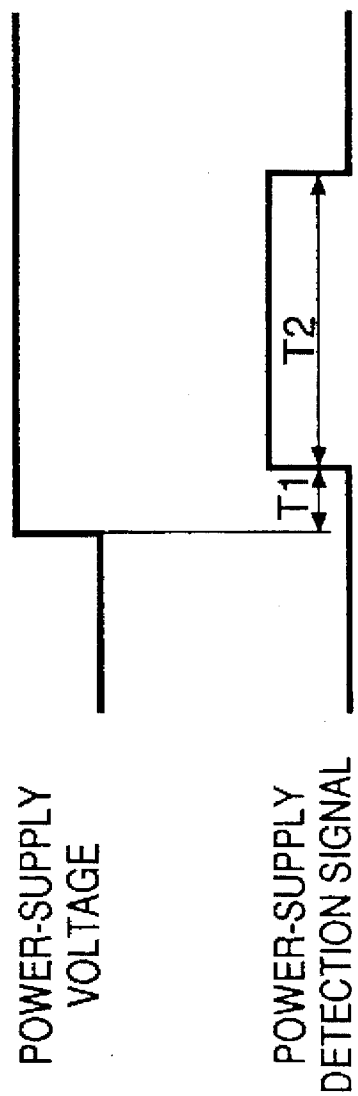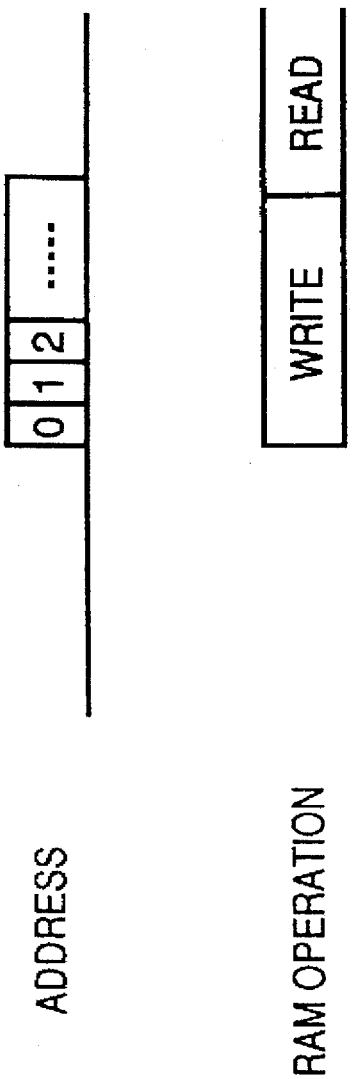
FIG. 14A POWER-SUPPLY VOLTAGE
FIG. 14B POWER-SUPPLY DETECTION SIGNAL
FIG. 14C ADDRESS
FIG. 14D RAM OPERATION

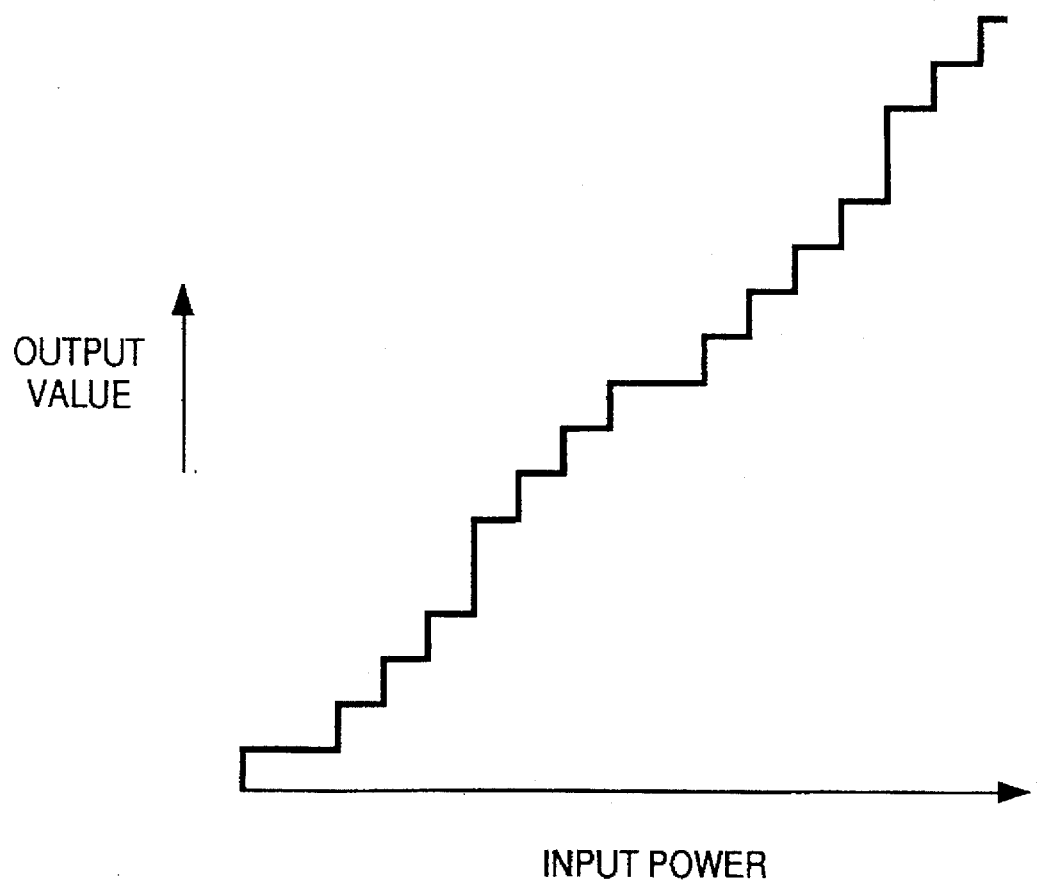
F I G. 39

A/D CONVERTING APPARATUS AND IMAGE SENSING APPARATUS

BACKGROUND OF THE INVENTION

This invention relates to an A/D converting apparatus for converting an analog signal such as a video signal into a digital signal, as well as to an image sensing apparatus.

Recent progress in technology for the processing of digital signals has been accompanied by the provision of many image sensing apparatus in which an analog image pick-up signal obtained from an image sensing element such as a CCD is converted into a digital signal using an A/D converter, the digital image pick-up signal is applied to a digital-signal processing circuit and subjected to such signal processing as a gamma correction, clipping and blanking to form a composite video signal.

In an image sensing apparatus of this kind, the section that processes the digital signal in principle has very little adverse effect upon the signal. This means that the conversion error characteristic of the A/D converter is very important. Many A/D converters that are in use have a conversion bit number of eight to ten bits, and these converters often are of the flash or half-flash type in order to deal with the data rate (10~20 MHz) of the image pick-up signal.

In the flash-type system, reference voltages, the number of which (e.g., 255) is one less than the number of levels (e.g., 256 in the case of eight bits) represented by the conversion bits, are compared with the analog input signal simultaneously by the same number of comparators.

In the half-flash system, two flash-type stages each having a small number of levels are used. The first stage performs a coarse conversion for D/A converting the signal and then subtracting it from the analog input signal. The signal resulting from subtraction is then finely converted by the second stage. The output of the first stage is delivered as higher order bits and the output of the second stage is outputted as the lower order bits.

However, the following problem arises in the image sensing apparatus using the conventional A/D converter described above:

If the conversion characteristic of the A/D converter has a region in which the error becomes large at a specific level, a portion of the image will develop contour noise (a false contour). In particular, in the case of an image sensing apparatus using the half-flash A/D converter described above, a large conversion error occurs even at points where the higher-order bits change.

A method of solving this problem involves trimming a resistor or the like of an IC circuit by laser trimming to finely adjust the reference voltage. However, this leads to much higher cost.

Further, the cause of the prominent conversion error in the A/D converter is as follows:

FIG. 1 illustrates the general construction of one example of an image sensing apparatus according to the prior art. As shown in FIG. 1, the apparatus includes a CCD image sensing element 51, an A/D converter 52, a γ-corrector circuit 53, a knee circuit 54, a diaphragm 55 for adjusting the amount of light incident upon the CCD image sensing element 51, and a microprocessor 56 for controlling the amount of opening of the diaphragm 55 in conformity with the output level of the A/D converter 52.

The function of the γ-corrector circuit 53 is to correct a non-linear light-emission characteristic at the tube surface of a television receiver (not shown). The knee circuit 54 functions to saturate a high-brightness signal more than the γ characteristic.

The conversion characteristics of the γ-corrector circuit and knee circuit 54 are illustrated in FIG. 2. In the output range of the A/D converter 52, ⅓ is allocated to the γ characteristic and ⅔ is allocated to the knee characteristic.

This means that the brightness of an ordinary subject is on the order of ⅓ the brightness of a very bright subject, such as a night scene or a subject lit by sunlight, and that a video signal obtained by imaging an ordinary subject is digitally converted over a range that is ⅓ of the output range of the A/D converter 52.

Accordingly, the case of an ordinary subject, a deterioration in the S/N ratio due to quantization noise readily occurs and results in a video signal of poorer quality. In order to prevent this, consideration has been given to increasing the number of bits of the A/D converter, in addition to the application of the trimming mentioned above. However, this is undesirable since it necessitates a great increase in the number of comparators of the A/D converter.

SUMMARY OF THE INVENTION

A first object of the present invention is to provide an inexpensive and highly precise A/D converting apparatus.

A second object of the present invention is to provide an image sensing apparatus whereby a high-quality image signal can be obtained without increasing the number of bits of an A/D converter.

In order to attain the first object of the invention, the present invention provides an A/D converting apparatus which, in accordance with a first aspect thereof, comprises a first A/D converter to which an analog input signal is applied as an input, a plurality of D/A converters to which an output signal from the first A/D converter is applied as an input, a subtractor for performing subtraction between at least one output from the plurality of D/A converters and the analog input signal, and a second A/D converter, to which an output from the subtractor is applied as an input, having a resolution higher than a resolution of the first A/D converter.

Further, in order to attain the first object of the invention, the present invention provides an A/D converting apparatus which, in accordance with a second aspect thereof, comprises a first A/D converter to which an analog input signal is applied as an input, a D/A converter to which an output signal from the first A/D converter is applied as an input, a subtractor for performing subtraction between an output from the D/A converter and the analog input signal, a second A/D converter, to which an output from the subtractor is applied as an input, having a resolution higher than a resolution of the first A/D converter, and changeover means for changing over a reference voltage that decides the operating range of the first A/D converter.

Further, in order to attain the first object of the invention, the present invention provides an A/D converting apparatus which, in accordance with a third aspect thereof, comprises a first A/D converter to which an analog input signal is applied as an input, corrective-data generating means for generating corrective data in dependence upon an output from the first A/D converter, a D/A converter to which an output signal from the first A/D converter is applied as an input, a subtractor for subtracting an output of the D/A converter and the corrective data from the analog input signal, and a second A/D converter, to which an output from the subtractor is applied as an input, having a resolution higher than a resolution of the first A/D converter.

In order to attain the second object of the invention, the present invention provides an image sensing apparatus for digitally converting an image signal, which is outputted by an image sensing element, by an A/D converter and performing image processing. In a first aspect thereof, the image sensing apparatus comprises correcting means connected to an output terminal of the A/D converter for synthesizing corrective data that corrects a conversion error characteristic of the A/D converter, and video-signal forming means for forming a video signal by applying signal processing to an output signal of the A/D converter corrected by the corrective data.

Further, in order to attain the second object of the invention, the present invention provides an image sensing apparatus which, in accordance with a second aspect thereof, comprises an image sensing element for converting an optical image, which has been formed on an image pick-up surface, into an electric image pick-up signal and outputting the image pick-up signal, an A/D converter for converting the image pick-up signal outputted by the image sensing element into a digital signal, level detecting means for detecting the level of the image pick-up signal outputted by the A/D converter, adjusting the means for adjusting amount of light incident upon the image sensing element in dependence upon the level detected by the level detecting means, γ-knee converting means having a plurality of conversion characteristics for applying non-linear processing to the image pick-up signal outputted by the image sensing element, and selecting means for selecting one of the plurality of γ-knee characteristics in dependence upon the output signal level of the A/D converter.

In order to attain the second object of the invention, the present invention provides an image sensing apparatus for converting an optically formed image into an electric signal. In a third aspect thereof, the image sensing apparatus comprises first and second A/D converting means for converting the photoelectrically converted image pick-up signal into a digital image pick-up signal, the first A/D converter determining higher-order bits of the-digital image pick-up signal after conversion and the second A/D converting means determining higher-order bits of the digital image pick-up signal after conversion, and generating means for combining the higher-order bits and lower-order bits and generating a digital image pick-up signal output.

In order to attain the second object of the invention, the present invention provides an image sensing apparatus for converting an optically formed image into an electric signal. In a fourth aspect thereof, the image sensing apparatus comprises means for generating a video signal, which has color information, from the photoelectrically converted image pick-up signal, and means for subjecting the video signal having the color information to a non-linear conversion in which a light-emitting state of a picture tube is rendered appropriate in terms of vision.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 14A to 14D are timing charts showing another operation of the sixth embodiment;

FIG. 39 is a characteristic diagram showing the conversion characteristic of the A/D converter of FIG. 38.

DESCRIPTION OF THE PREFERRED EMBODIMENTS

Preferred embodiments of the present invention will now be described with reference to the accompanying drawings.

(First Embodiment)

Figure 1:
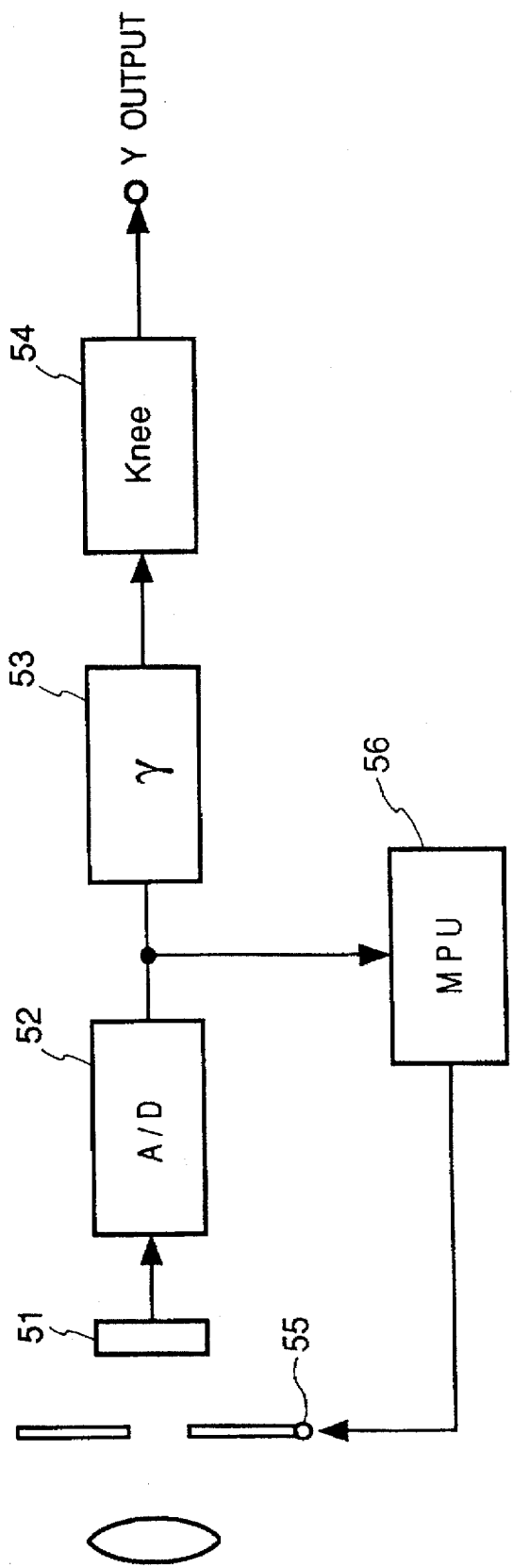
FIG. 1 is a diagram showing the general construction of an example of an image sensing apparatus according to the prior art.
Figure 2:
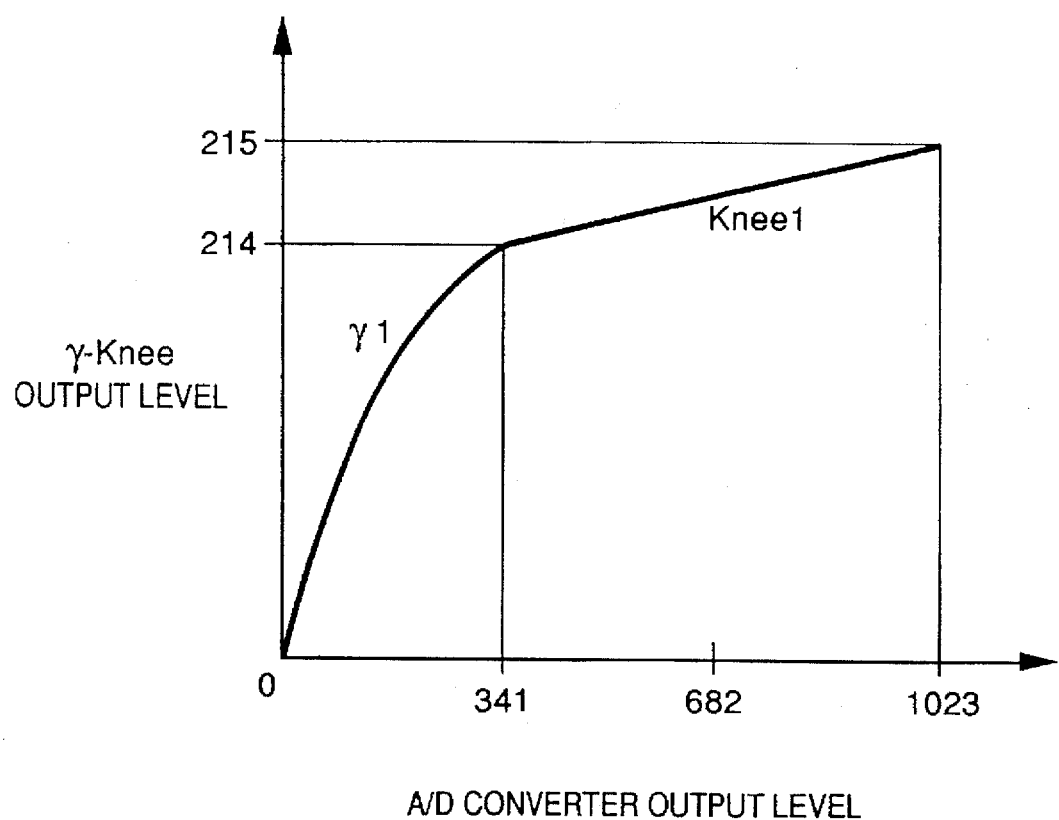
FIG. 2 is a characteristic diagram showing the relationship between a γ-knee output level and the output level of an A/D converter.
Figure 3:
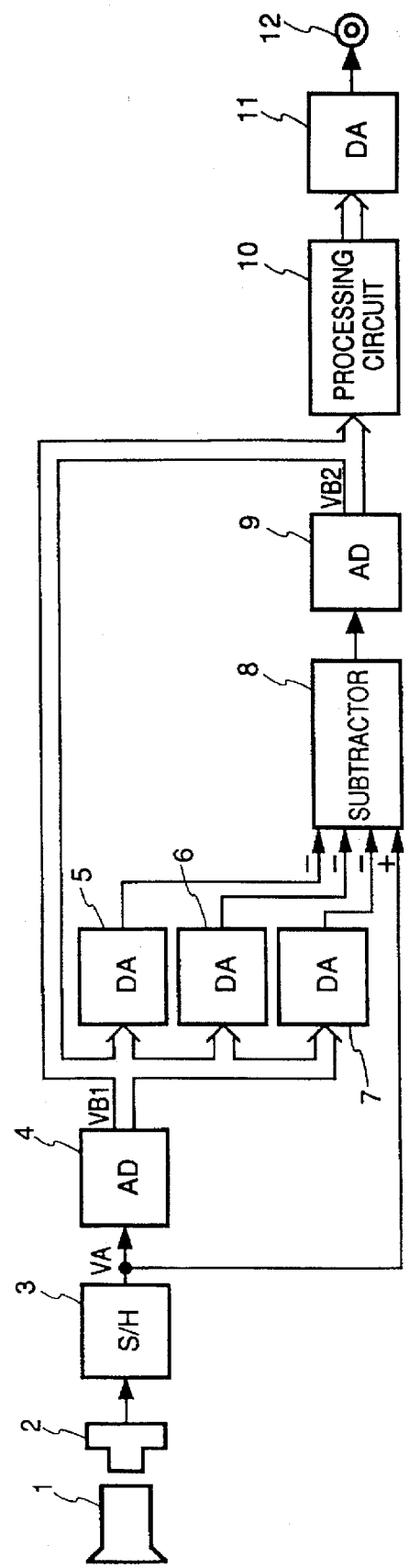
FIG. 3 is a block diagram illustrating a first embodiment of the present invention.

FIG. 3 is a block diagram illustrating a first embodiment of the invention applied to an image sensing apparatus.

As shown in FIG. 3, the image sensing apparatus includes an optical system 1 including an image pick-up lens and an optical filter, etc., a CCD 2 serving as an image sensing element, a sample-and-hold circuit 3, an A/D converter 4, D/A converters 5, 6, 7, a subtractor 8, an A/D converter 9, a processing circuit 10 constituted by digital-signal processing circuit and a D/A converter 11 having an output terminal 12.

Operation of the apparatus constructed as set forth above will now be described.

The image of a subject is formed on the image pickup surface of the CCD 2 by the optical system 1 and is photoelectrically converted by each pixel of the CCD 2, whereby image pick-up signals are produced. The image pick-up signals are converted into a continuous analog input signal VA by the sample-and-hold circuit 3, after which the signal VA is converted into a digital signal by the A/D converter 4. The output of the A/D converter 4 enters the processing circuit 10 as higher-order bits VB1 of the digital image pick-up signal and enters the D/A converters 5, 6, 7. The input signals to the D/A converters 5, 6, 7 are converted into analog signals thereby.

These outputs include errors owing to a variance in, say, the group of resistors or switches constituting the D/A converters 5, 6, 7. These outputs enter the subtractor 8 along with the output of the sample-and-hold circuit 3. The subtractor 8 subtracts the average value of the outputs of the three D/A converters 5, 6, 7 from the output VA of the sample-and-hold circuit 3.

The output of the subtractor 8 is A/D converted by the A/D converter 9 and the result is fed, along with the higher-order bits VB1, into the processing circuit 10 as lower-order bits VB2 of the digital image pick-up signal.

In this case, the input range of the A/D converter 4 is set to the full range of the output of the sample-and-hold circuit 3 in order to generate the higher-order bits. Further, the input range of the A/D converter 9 is set substantially to the minimum resolution of the A/D converter 4 in order to generate the lower-order bits. For example, in a case where the A/D converter 4 has a resolution of four bits, the input range of the A/D converter 9 is set to 1/16 of that of the A/D converter 4.

The processing circuit 10 is so adapted that the entered digital image pick-up signal is subjected to prescribed processing such as a gamma correction, black clipping, white clipping and blanking by the digital-signal processing circuit, thereby forming a digital video signal. Next, the digital video signal is D/A converted into a composite video signal by the D/A converter 11. This signal is supplied from the output terminal 12 to an external device such as a television or VTR.

(Second Embodiment)

Figure 4:
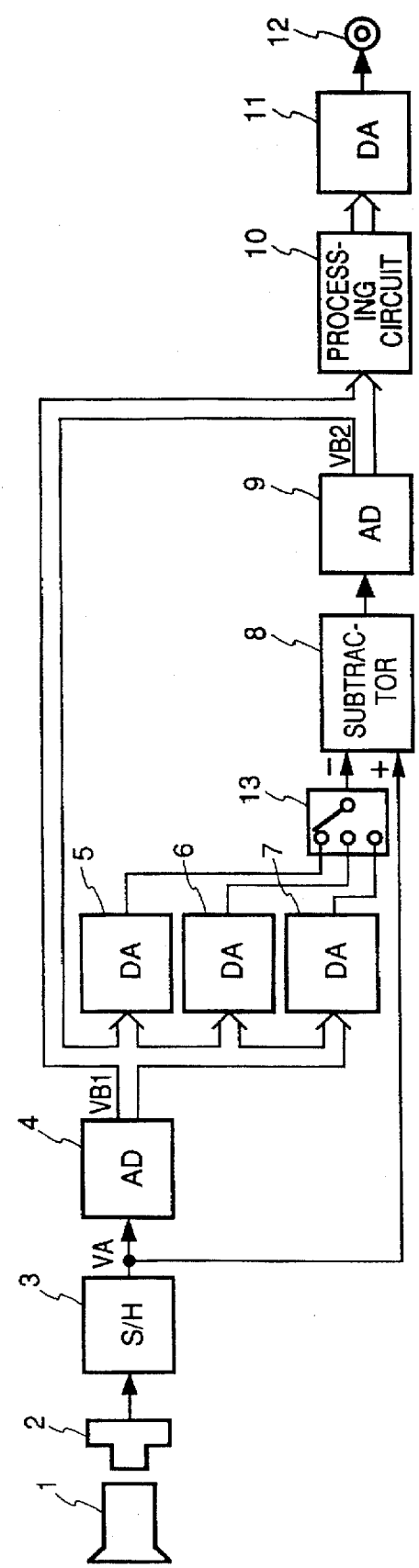
FIG. 4 is a block diagram illustrating a second embodiment of the present invention.

FIG. 4 illustrates a second embodiment of the invention, in which elements having the same functions as those in FIG. 3 are designated by like reference numerals.

The arrangement of FIG. 4 includes a switch 13 for changing over among the outputs of the D/A converters 5, 6, 7.

The operation of this embodiment will now be described.

Operation up to the D/A converters 5, 6, 7 is the same as described in connection with FIG. 3. The outputs of the D/A converters 5, 6, 7 enter the switch 13. The latter selects one of the three input signals and applies it to the subtractor 8. The subtractor 8 subtracts the input selected by the switch 13 from the output signal VA of the sample-and-hold circuit 3 and applies the result to the A/D converter 9, whereby the lower-order bits VB2 are produced. Subsequent operation is similar to that described above.

When the apparatus is manufactured, the switch 13 is designed to discriminate which of the D/A converters 5, 6, 7 has the smallest error and to select this converter. Alternatively, the switch 13 is designed in such a manner that the output from one of the three D/A converters having the smallest error is selected depending upon conditions of use, such as the power-supply voltage.

(Third Embodiment)

Figure 5:
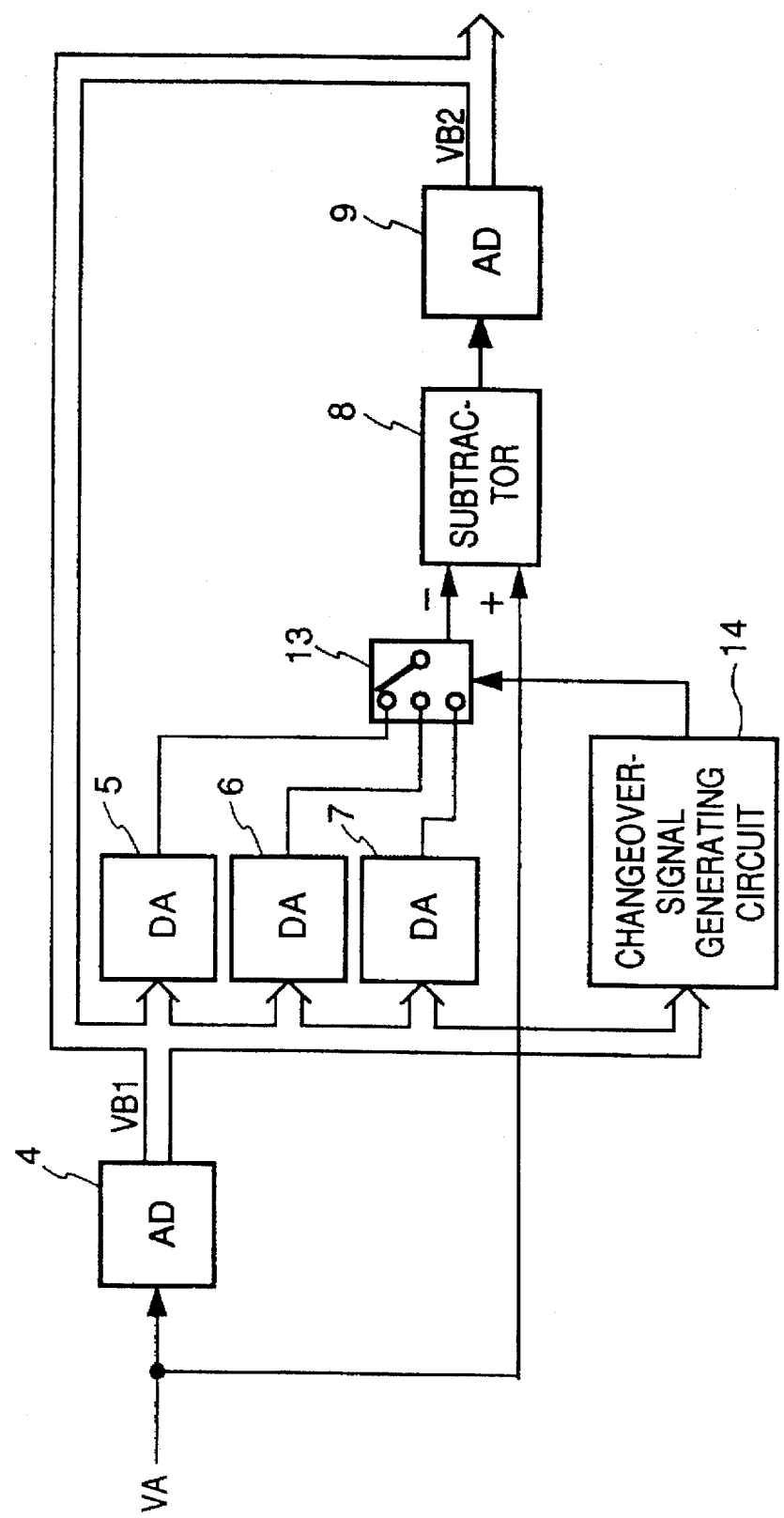
FIG. 5 is a block diagram illustrating a third embodiment of the present invention.

FIG. 5 illustrates a third embodiment of the present invention, in which only portions that differ from FIGS. 3 and 4 are illustrated.

As shown in FIG. 5, numeral 14 denotes a changeover signal generating circuit. The A/D converter 4 outputs the higher-order bits VB1 of the digital image pick-up signal in the manner described above. The higher-order bits VB1 enter the processing circuit 10 and the three D/A converters 5, 6, 7 as well as the changeover signal generating circuit 14. The latter generates a changeover signal in dependence upon an input signal representing the higher-order bits VB1 applied thereto, thereby changing over the switch 13 so that one of the output signals of the D/A converters 5, 6, 7 is delivered to the subtractor 8.

With regard to the output signal of the changeover signal generating circuit 14 corresponding to the input signal thereof, it will suffice to measure the errors of the D/A converters 5, 6, 7 in advance and store the appropriate output signals in the memory within the changeover signal generating circuit 14 in such a manner that whichever of the D/A converters 5, 6, 7 has the smallest error will be selected for each level of the input signal.

Alternatively, a sequence circuit or random-number circuit may be provided within the changeover signal generating circuit 14 so as to generate a changeover signal that varies in a time series. If this expedient is adopted, the errors of the D/A converters 5, 6, 7 will be dispersed.

In each of the foregoing embodiments, the three D/A converters 5, 6, 7 are combined with the subtractor 8. However, this does not impose a limitation upon the invention. Only two D/A converters may be provided if the effects are satisfactory. If higher accuracy is required, four or more D/A converters may be used. If the number of D/A converters used is increased, error resulting from the D/A converters is reduced.

(Fourth Embodiment)

Figure 6:
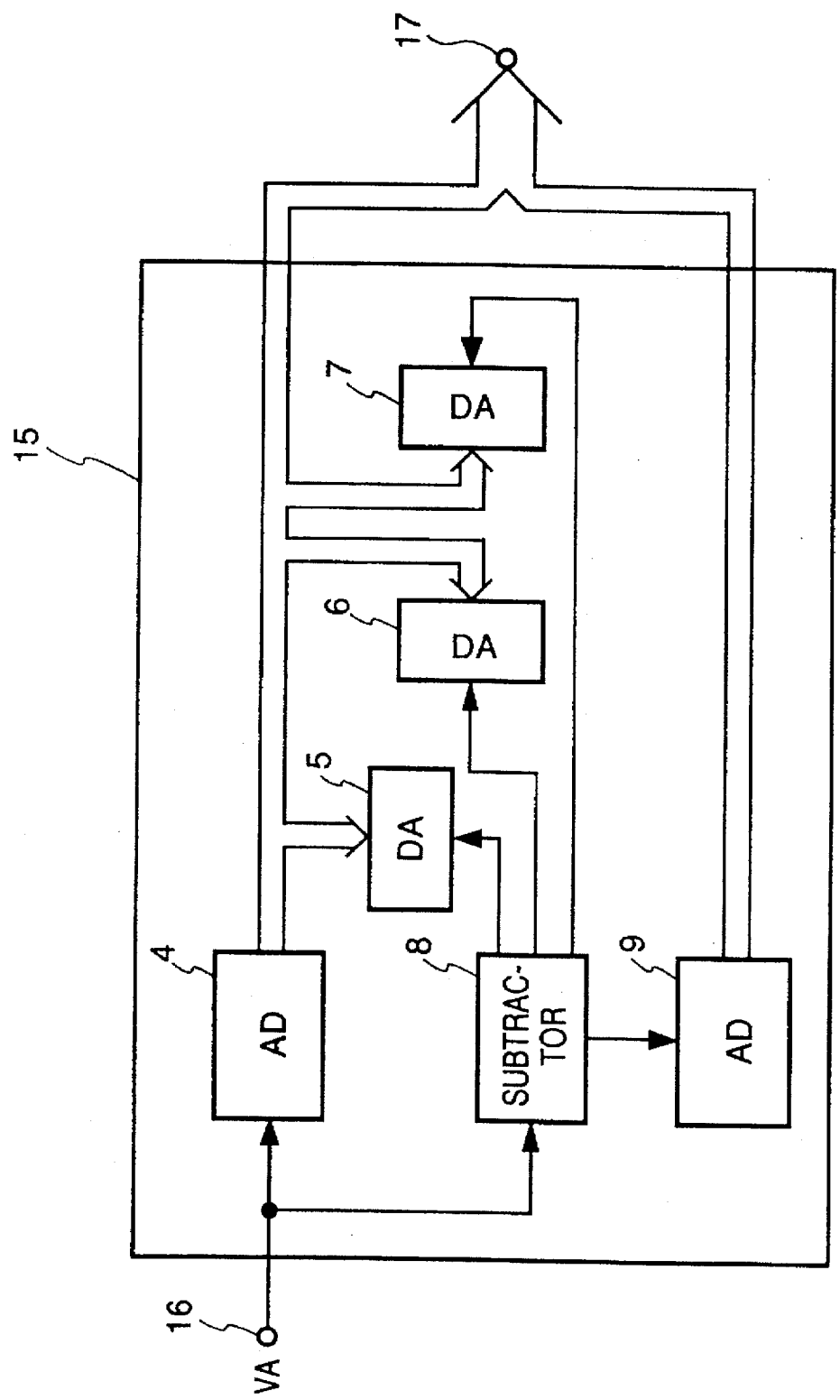
FIG. 6 is a block diagram illustrating a fourth embodiment of the present invention.

FIG. 6 illustrates a fourth embodiment of the invention, in which the circuitry of FIG. 3 is constructed on a single semiconductor chip.

As shown in FIG. 6, the A/D converters 4, 9, the D/A converters 5, 6, 7 and the subtractor 8 in FIG. 3 are arranged and constructed on a single semiconductor chip 15 in the manner illustrated. Further, an input terminal 16 connected to the sample-and-hold circuit 3 and an output terminal 17 connected to the processing circuit 10 are provided. It should be noted that the D/A converters 6, 7 are arranged at right angles to the D/A converter 5, and that the D/A converters 6, 7 are arranged in axial symmetry. By adopting this arrangement, it is possible to disperse the portion of the error, produced by each of the D/A converters 5, 6, 7, that is ascribable to a deviation in terms of the semiconductor manufacturing process.

The portions arranged on the single semiconductor chip 15 in FIG. 6 are not limited to those shown; the processing circuit 10, sample-and-hold circuit 3, etc., can also be constructed on the same semiconductor chip 15. Furthermore, the switch 13 and changeover signal generating circuit 14 in FIGS. 4 and 5 may also be constructed on the same semiconductor chip.

(Fifth Embodiment)

Figure 7:
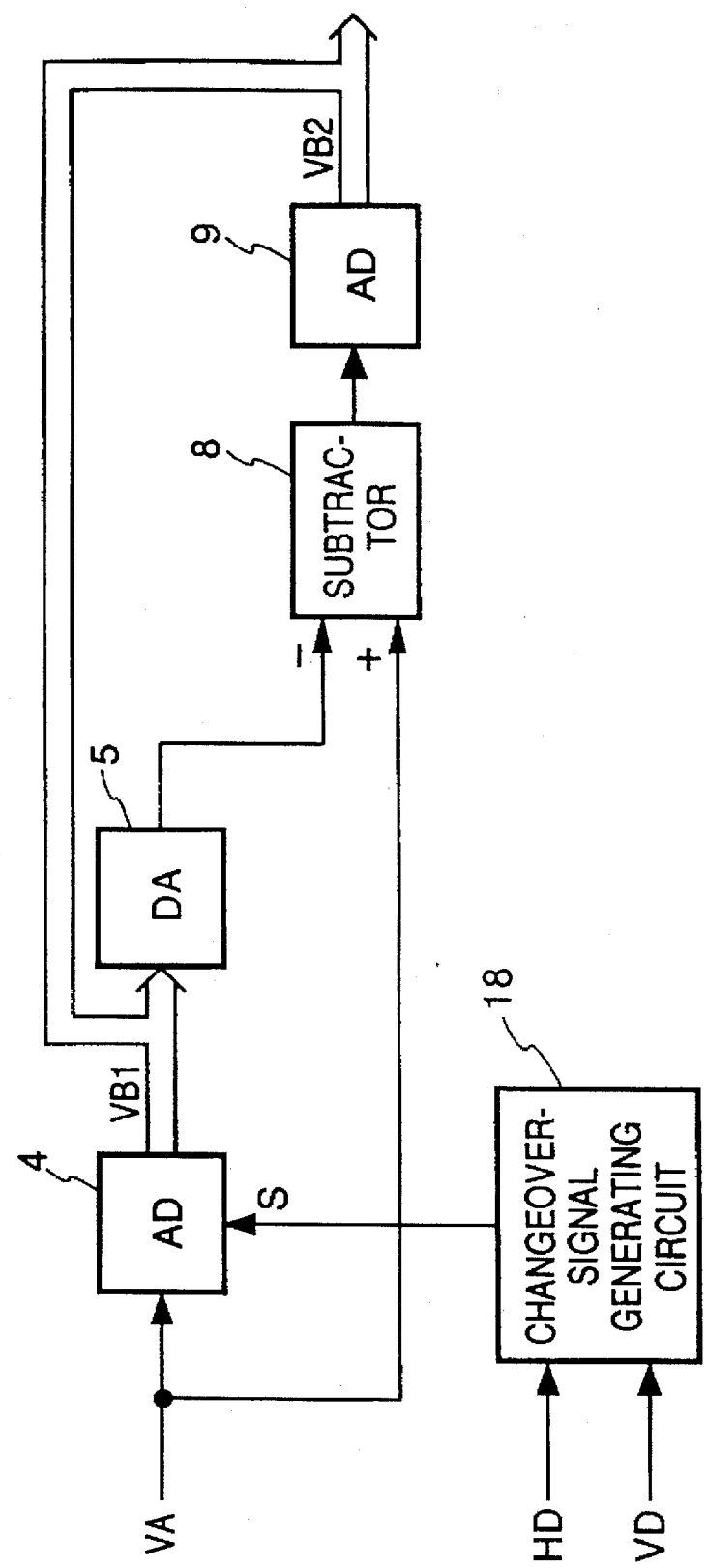
FIG. 7 is a block diagram illustrating a fifth embodiment of the present invention.

FIG. 7 illustrates a fifth embodiment of the invention, in which blocks identical with those in FIG. 3 are designated by like reference numerals.

In FIG. 7, numeral 18 denotes a changeover signal generating circuit for outputting a changeover signal S that changes over the operation of the A/D converter 4 in dependence upon a horizontal synchronizing signal HD and a vertical synchronizing signal VD. In this embodiment, the output of the A/D converter 4 is applied to just one D/A converter, namely the D/A converter 5.

Figure 8:
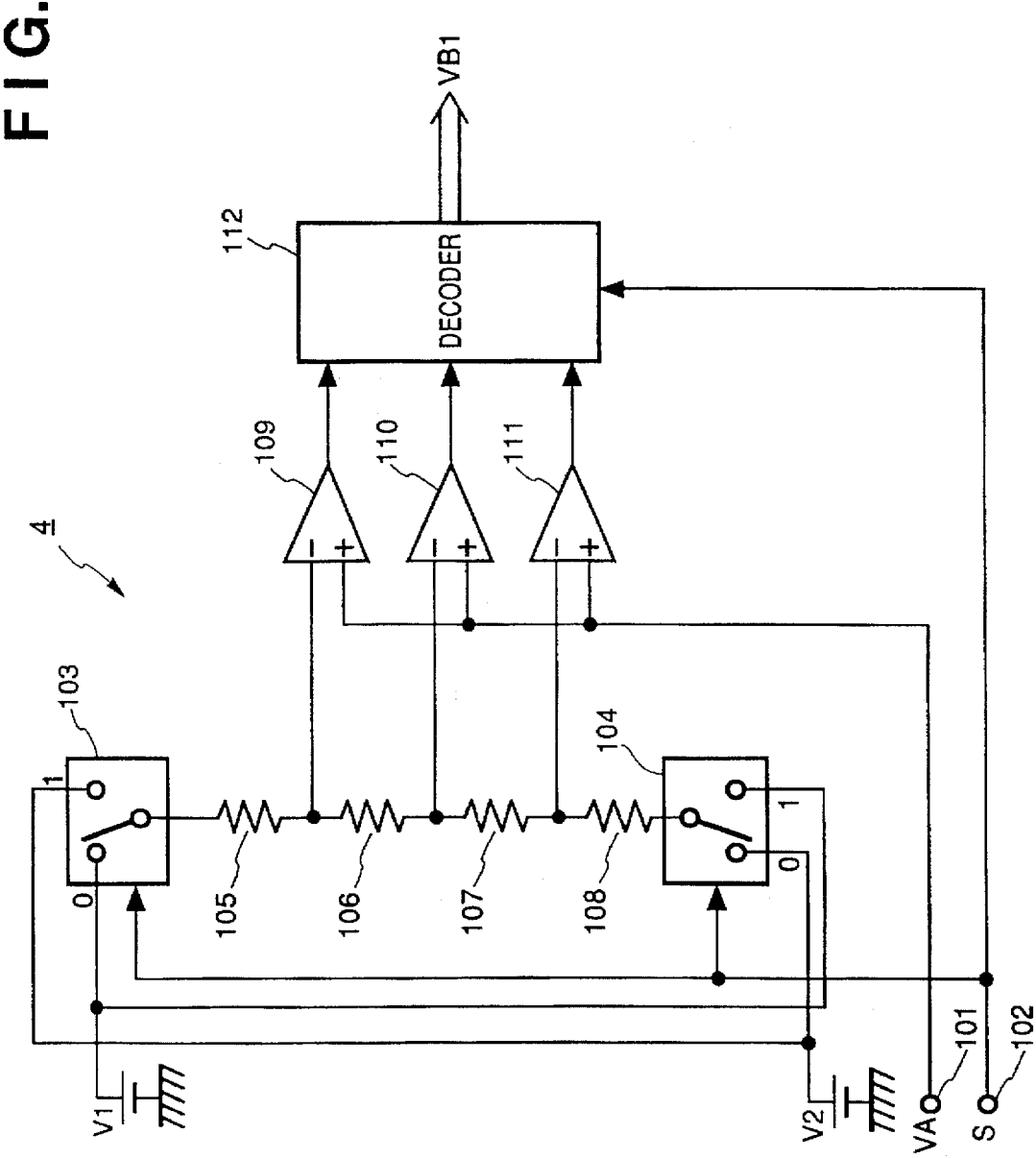
FIG. 8 is a diagram showing the construction of an embodiment of an A/D converter.

FIG. 8 illustrates an embodiment of the A/D converter 4, which has an input terminal 101 for the analog input signal from the sample-and-hold circuit 3, an input terminal 102 for the changeover signal S, switches 103, 104, serially connected resistors 105, 106, 107, 108, comparators 109, 110, 111 and a decoder 112 for converting an input signal into a binary number. V1 and V2 represent reference voltages.

The operation of this embodiment will now be described.

In FIG. 7, the changeover signal generating circuit 18 generates the changeover signal S for dispersing the error of the A/D converter 4 in dependence upon the horizontal synchronizing signal HD and vertical synchronizing signal VD. The A/D converter 4 changes over its internal operation in conformity with the changeover signal S to disperse the conversion error.

In FIG. 8, the analog input signal VA that enters from the input terminal 101 is compared with reference voltages at other input terminals by respective ones of the comparators 109, 110, 111, and the results of comparison are fed into the decoder 112, which outputs the results as digital data. The reference voltages applied to the other input terminals of the comparators 109, 110, 111 are produced by the reference voltages V1, V2 and a circuit composed of the switches 103, 104 and the resistors 105–108. The switches 103, 104 are changed over in dependence upon the changeover signal S from the input terminal 102.

When the changeover signal S is 0, the path of the current is V1, switch 103, resistors 105, 106, 107, 108, switch 104 and V2. When the changeover signal S is 1, the path of current is V1, switch 104, resistors 108, 107, 106, 105, switch 103 and V2. The direction of the current that flows through the resistors 105–108 when the signal S is 1 is opposite that when the signal S is 0. Each resistor includes some manufacturing error and the input offset characteristics of the comparators 109–111 include some variance. However, the variance can be dispersed by changing over the switches 103, 104, as mentioned above. At such time the correlation between the outputs of the comparators 109–111 and the binary number changes in conformity with the changeover of the switches 103, 104. As a result, this is corrected in the decoder 112 in dependence upon the changeover signal S and the higher-order bits VB1 are outputted.

In order to disperse variance in this manner, the changeover signal S is generated by the changeover signal generating circuit 18 so as to be changed over sequentially or randomly line by line or field by field.

In FIG. 7, the output VB1 of the decoder 112 is delivered to the D/A converter 5, and the analog output of the D/A converter 5 is fed into the subtractor 8 together with the output VA of the sample-and-hold circuit 3. The subtractor 8 subtracts the output of the D/A converter 5 from VA and outputs the result to the A/D converter 9.

In FIG. 8, the two-bit A/D converter 4 is constructed from three comparators in order to simplify the description. However, this does not impose a limitation upon the invention. An A/D converter having any number n of conversion bits can be realized by $2^n-1$ comparators.

Figure 9:
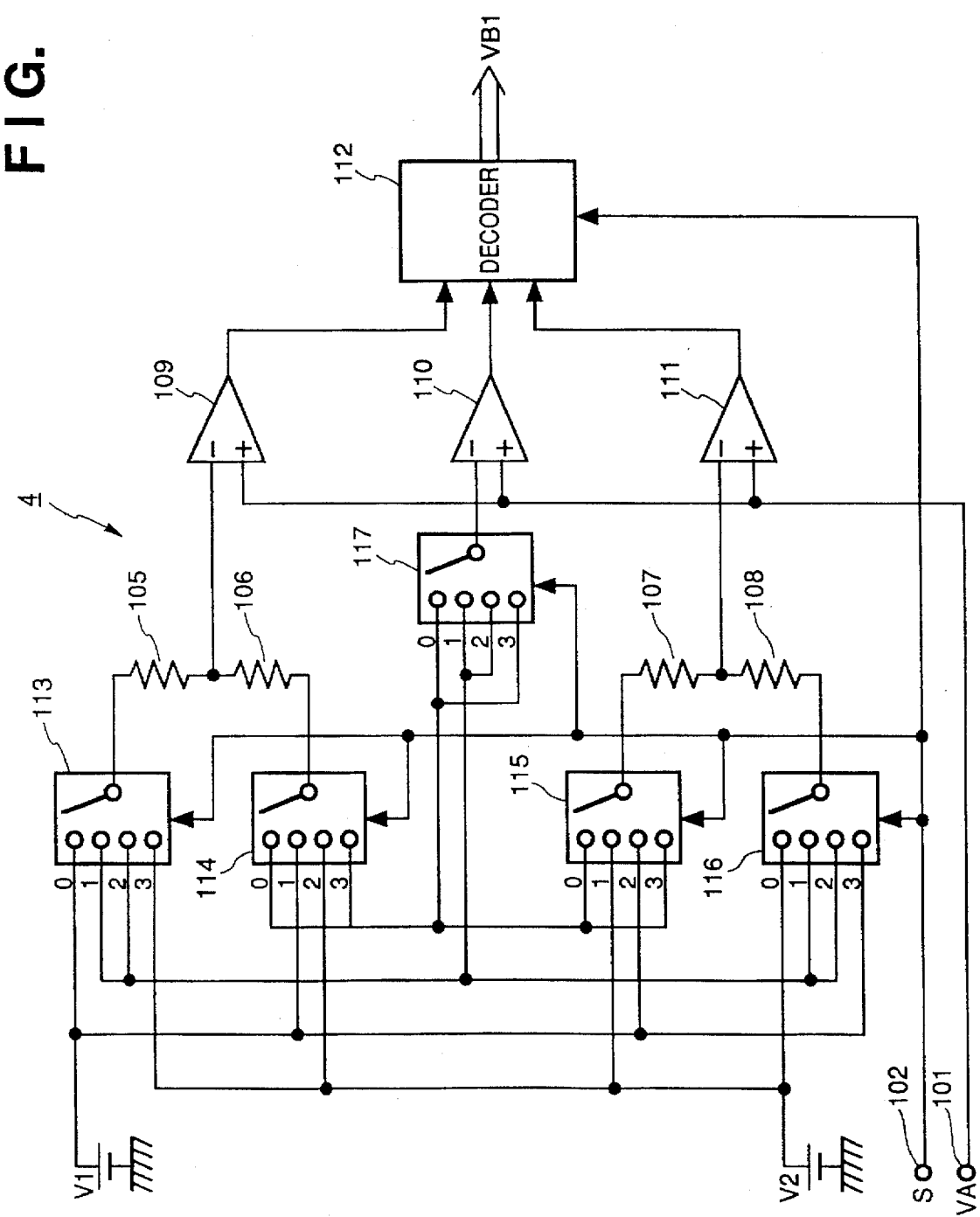
FIG. 9 is a diagram showing the construction of another embodiment of an A/D converter.

FIG. 9 illustrates another embodiment of the A/D converter 4 in which blocks having functions identical with those shown in FIG. 8 are designated by like reference numerals.

In FIG. 9, numerals 113, 114, 115, 116 and 117 denote switches each having terminals 0–3 changed over by a changeover signal S. As in FIG. 8, the analog input signal VA enters the comparators 109, 110, 111, whose outputs are converted into binary numbers by the decoder 112, the output of which is delivered as the higher-order bits VB1.

Reference voltages are generated by V1, V2, the switches 113–117 and the resistors 105–108 and enter the other input terminals of the comparators 109–111.

When the switches are changed over by the changeover signal S, the path of the current that flows through the resistors 105~108 also changes. The current paths are as follows, in which only the resistors corresponding to the current paths are mentioned in order to simplify the description:

when S=0: 105–106–107–108;
when S=1: 106–105–108–107;
when S=2: 107–108–105–106;
when S=3: 108–107–106–105.

Thus, the current path changes in dependence upon S. The switch 117 is changed over in such a manner that the voltage at the midpoint of the current path is applied to the comparator 110 at all times. The decoder 112, which changes over the relationship between its input and a binary number in conformity with the four values of the signal S, outputs the higher-order bits VB1 as an output signal of a binary number.

(Sixth Embodiment)

Figure 10:
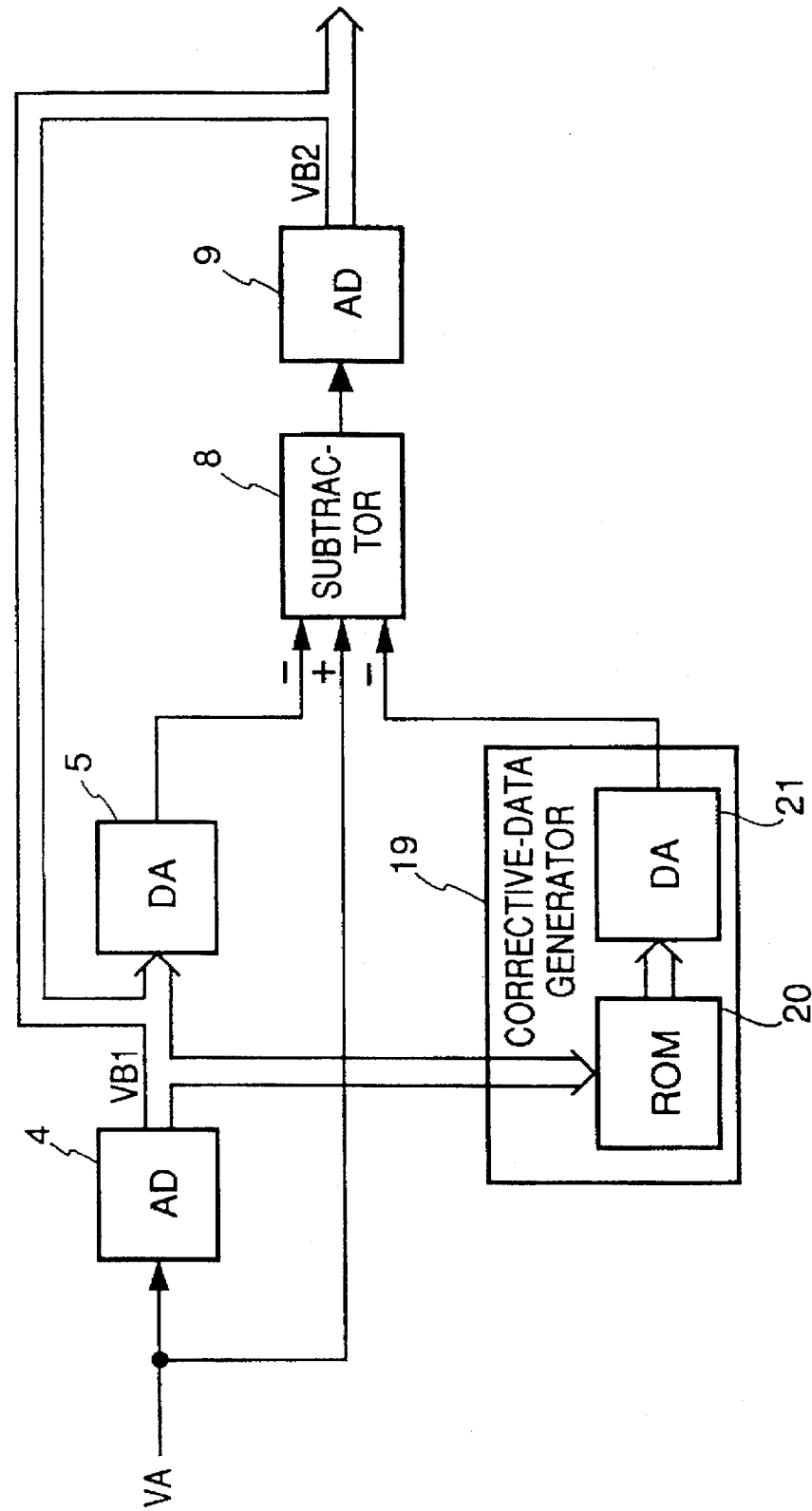
FIG. 10 is a block diagram illustrating a sixth embodiment of the present invention.

FIG. 10 illustrates a sixth embodiment of the present invention, in which blocks having functions identical with those shown in FIG. 7 are designated by like reference numerals.

In FIG. 10, numeral 19 denotes a corrective-data generating unit comprising a ROM 20 in which corrective data is written in advance, and a D/A converter 21 for converting the corrective data in an analog signal and outputting the analog signal to subtractor 8.

Figure 11:
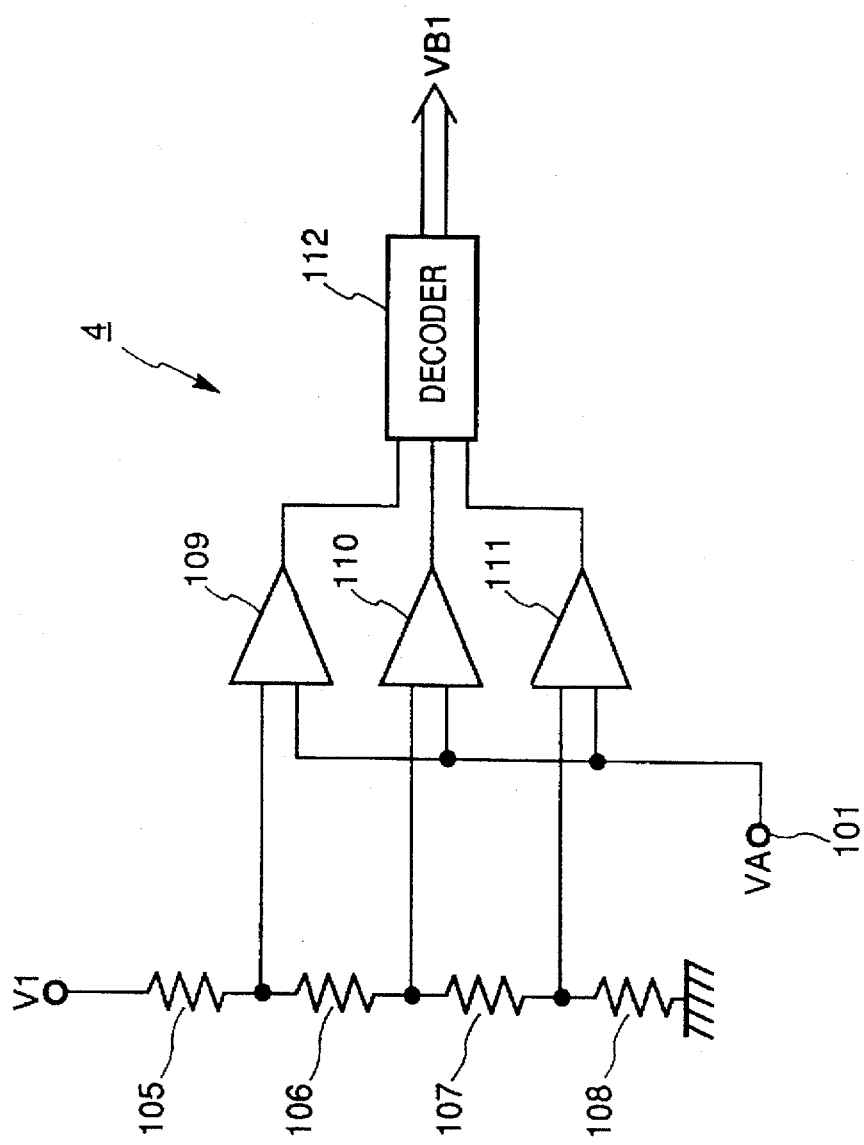
FIG. 11 is a diagram showing the construction of another embodiment of an A/D converter.

FIG. 11 illustrates the construction of the A/D converter 4, in which portions corresponding to those shown in FIGS. 8 and 9 are designated by like reference numerals.

It should be noted that A/D converter 9 also is constituted by four series resistors, three comparators and a decoder, etc., in the same manner as the A/D converter 4.

In order to simplify the description, it is shown that there are three comparators for higher-order bits and three comparators for lower-order bits in the A/D converters 4, 9. However, this does not impose a limitation upon the invention. For example, in order to construct eight-bit A/D converters 4, 9, a combination using 15 comparators in each is possible.

Operation will now be described.

In FIG. 11, the comparators 109~111 compare the analog input signal VA from the input terminal 101 with the reference voltages that are the result of potential dividing the reference voltage V1 by the resistors 105~108. In this case, the reference voltage V1 is set in conformity with the dynamic range of the analog input signal VA. For example, if VA is 0~2 V, then V1 also is set to 2 V. As a result, reference voltages 1.5 V, 1 V and 0.5 V are generated by the resistors 105~108.

The outputs of the comparators 109~111 are converted into binary numbers by the decoder 112, the output of which is delivered as the higher-order bits VB1. This output enters the D/A converter 5. In this example, therefore, any of the outputs 0 V, 0.5 V, 1 V and 1.5 V is obtained from the D/A converter 5. The output of the decoder 112 enters also the corrective-data generating unit 19 (FIG. 10) as the address of the ROM 20. Corrective data that corrects for the errors in the resistors 105~108, comparators 109~111 and D/A converter 5 is written in the ROM 20 in advance.

Corrective data read out of the ROM 20 is converted into analog data by the D/A converter 21. The output range of the D/A converter 21 at this time is made to conform to the maximum value of the error produced. Briefly stated, this is set to positive and negative values of one to several levels of a group of reference voltages outputted by the three resistors constituting the A/D converter 9 for the lower-order bits.

The output of the D/A converter 21, the output of the D/A converter 5 and the analog input signal VA enter the subtractor 8, where the outputs of the two D/A converters 5, 21 are subtracted from the analog input signal VA. The output of the subtractor 8 enters the three comparators constituting the A/D converter 9 and is compared with the reference voltages obtained as a result of the potential-dividing action of the four serial resistors. One step of the group of reference voltages generated by the A/D converter 4 serves as the reference voltage applied to one end of the four serial resistors. In this example, one step is 0.5 V. Therefore, the reference voltage applied to the four series resistors is set to 0.5 V, and a group of reference voltages of 0.375, 0.25 and 0.125 V is generated by the respective resistors.

The output of the A/D converter 9 is delivered, along with the aforementioned higher-order bits VB1, as the lower-order bits VB2.

Figures 12A, 12B, 12C, 12D:
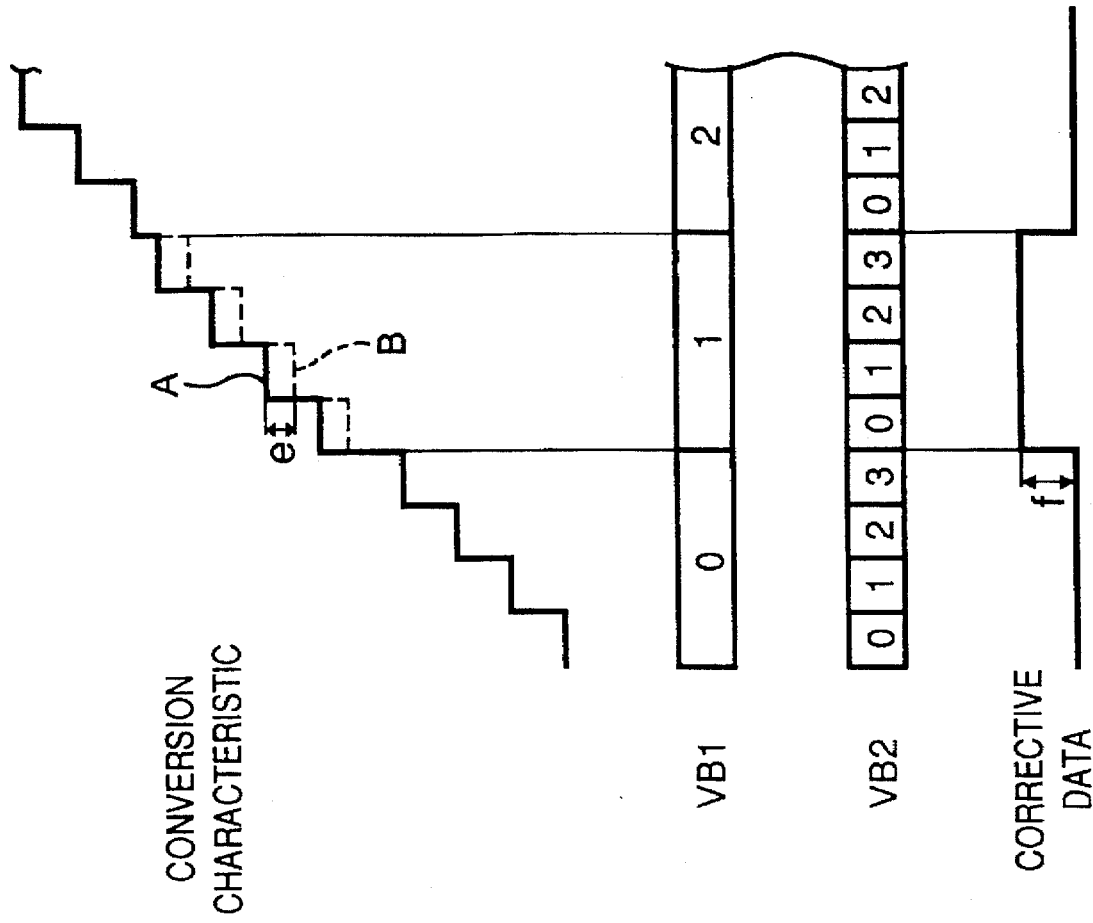
FIGS. 12A to 12D are timing charts showing the operation of the sixth embodiment.

FIGS. 12A to 12D are diagrams for describing the operation of FIG. 10. FIG. 12A illustrates the conversion characteristic of the A/D converter 4, FIG. 12B the values of the higher-order bits VB1 at this time, FIG. 12C the values of the lower-order bits VB2 at this time, and FIG. 12D the level of the corrective data at this time.

First, in FIG. 12A, the conversion characteristic when no corrective data is being applied is indicated by A (the solid line). When the higher-order bits VB1 change at this time in FIG. 12B, the characteristic becomes one offset by an error e from the theoretical characteristic, indicated by B (the dashed line), owing to the errors in the resistors 105~108, comparators 109~111 and D/A converter 5, as mentioned above.

The corrective-data generating unit 19 generates the corrective data of FIG. 12D in dependence upon the values of the higher-order bits VB1 of FIG. 12B. If a value f at this time is assumed to be e=f, the characteristic A can be corrected to the characteristic of the theoretical value B.

Figure 13:
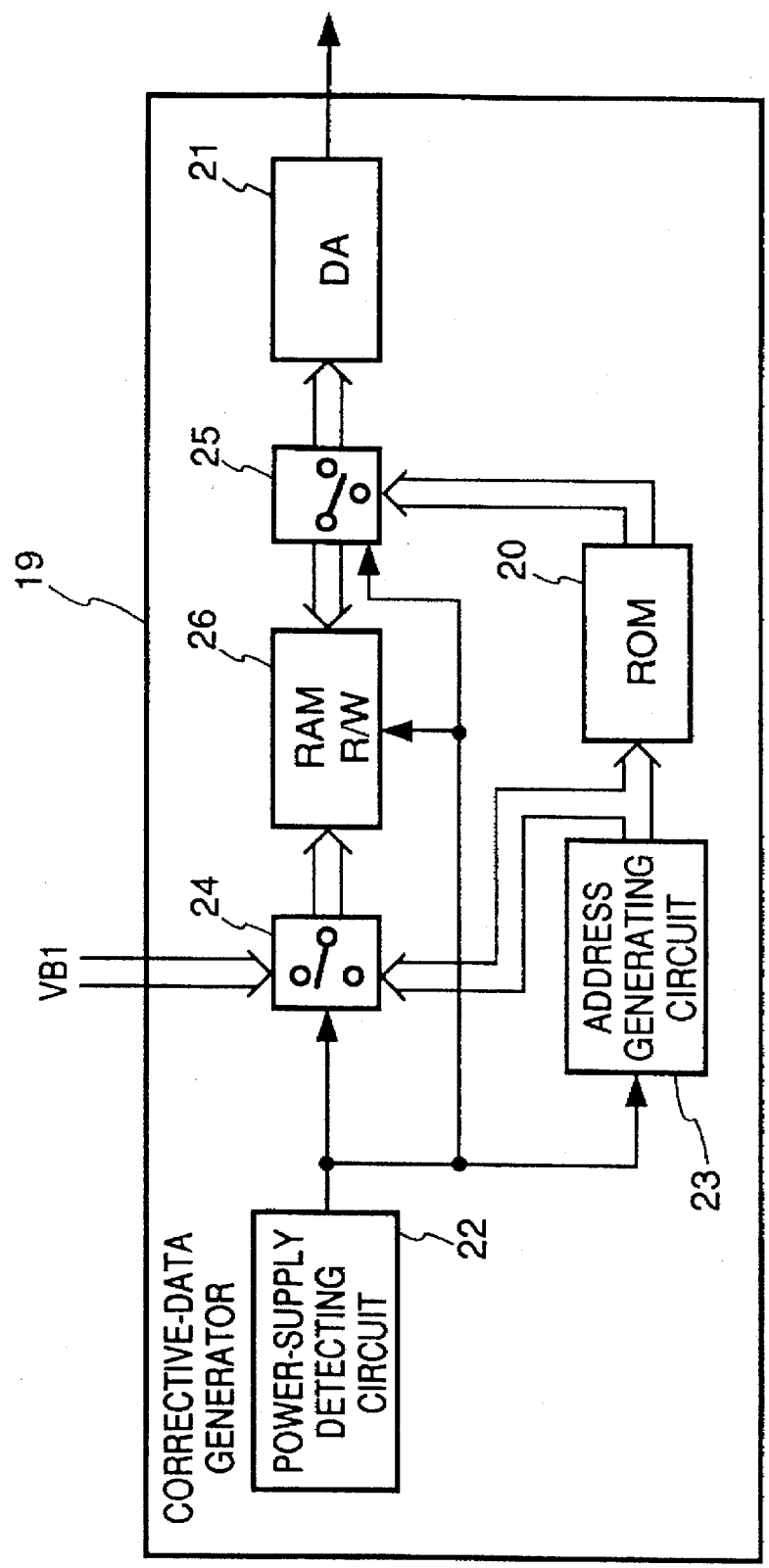
FIG. 13 is a block diagram showing an embodiment of a corrective-data generating unit.

FIG. 13 illustrates another embodiment of the corrective-data generating unit 19, in which portions having functions identical to those shown in FIG. 11 are designated by like reference characters.

Shown in FIG. 13 are a power-supply detecting circuit for generating a power-supply detection signal of a prescribed width when power is introduced, an address generating circuit 23 for generating prescribed addresses in a prescribed order in dependence upon the power-supply detection signal, switches 24, 25 and a RAM 26.

When power from the power supply is introduced, the power-supply detecting circuit 22 detects this and generates the power-supply detection signal of the prescribed width. As a result, the switch 24 is connected to the output side of the address generating circuit 23, the switch 25 is connected to the output side of the ROM 20 and the RAM 26 is changed over to a writing operation. Next, the address generating circuit 23 generates the prescribed addresses in the prescribed order, as mentioned above, and these enter the RAM 26 and ROM 20 as addresses. The prescribed corrective data is read out of the ROM 20 and written in the RAM 26.

Thereafter, the addresses from the address generating circuit 23 cease, the power-supply detection signal vanishes, the switch 24 is changed over to the side of the A/D converter 4, and the switch 25 is changed over to the D/A converter 21. The corrective data that has been written in the RAM 26 is read out in dependence upon the higher-order bits VB1 applied thereto, the corrective data is converted into analog data by the D/A converter 21 and the analog data enters A/D converter 4 as the corrective signal.

FIGS. 14A to 14D are diagrams for describing the foregoing operation. When power is introduced and the power-supply voltage rises, as shown in FIG. 14A, the power-supply detecting circuit 22 outputs the power-supply detection signal over a time period T2 following a delay T1, as shown in FIG. 14B. Addresses are read out successively during the time period T2, as shown in FIG. 14C, and the data in ROM 20 is written in the RAM 26 placed in the writing mode, as shown in FIG. 14D.

Thus, by using the RAM 16, a correction can be applied without any decline in conversion speed.

Each of the embodiments described above is for a case in which the A/D converting apparatus of the present invention is applied to an image sensing apparatus. However, it goes without saying that the present invention can be used also in a case in which an analog signal is converted to a digital signal in other types of electronic apparatus.

In the first through fourth embodiments described above, a plurality of D/A converters are provided and one of the outputs thereof or an average value of these outputs is subtracted from an analog input signal.

In the fifth embodiment, a reference voltage that decides the dynamic range of a first A/D converter is changed over.

In the sixth embodiment, corrective data is generated in dependence upon the output of the first A/D converter and this is applied to a subtractor.

Thus, in accordance with the first through sixth embodiments, output data having a high accuracy with respect to an analog input signal can be obtained by a simple arrangement without raising the accuracy of the A/D converter itself. Further, in a case where the invention is used in an image sensing apparatus, an apparatus having a high picture quality can be obtained at low cost.

(Seventh Embodiment)

Figure 15:
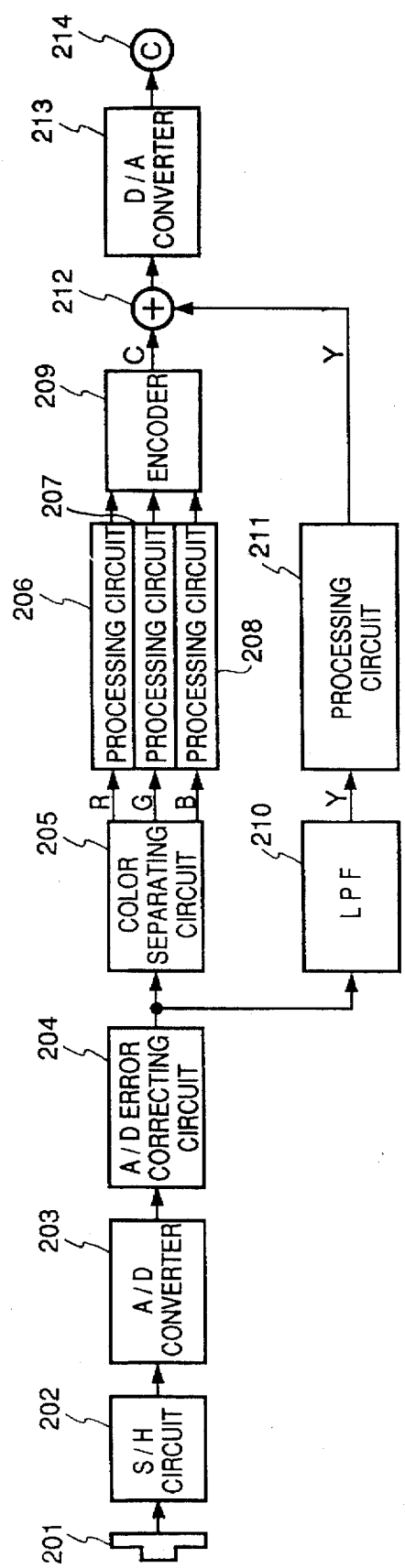
FIG. 15 is a block diagram illustrating the construction of an image sensing apparatus according to a seventh embodiment of the invention.
Figure 16:
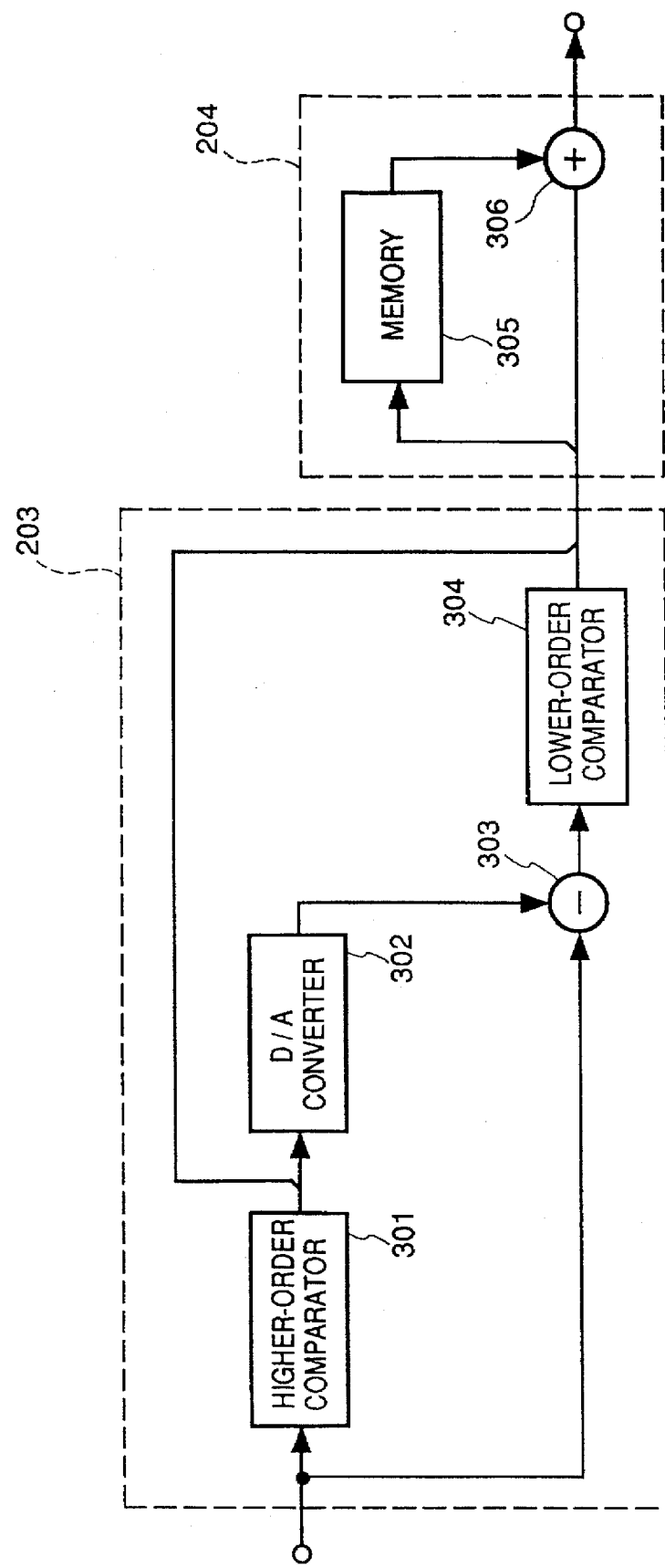
FIG. 16 is a block diagram showing the construction of an A/D converter and A/D error correcting circuit in the apparatus shown in FIG. 15.
Figure 17:
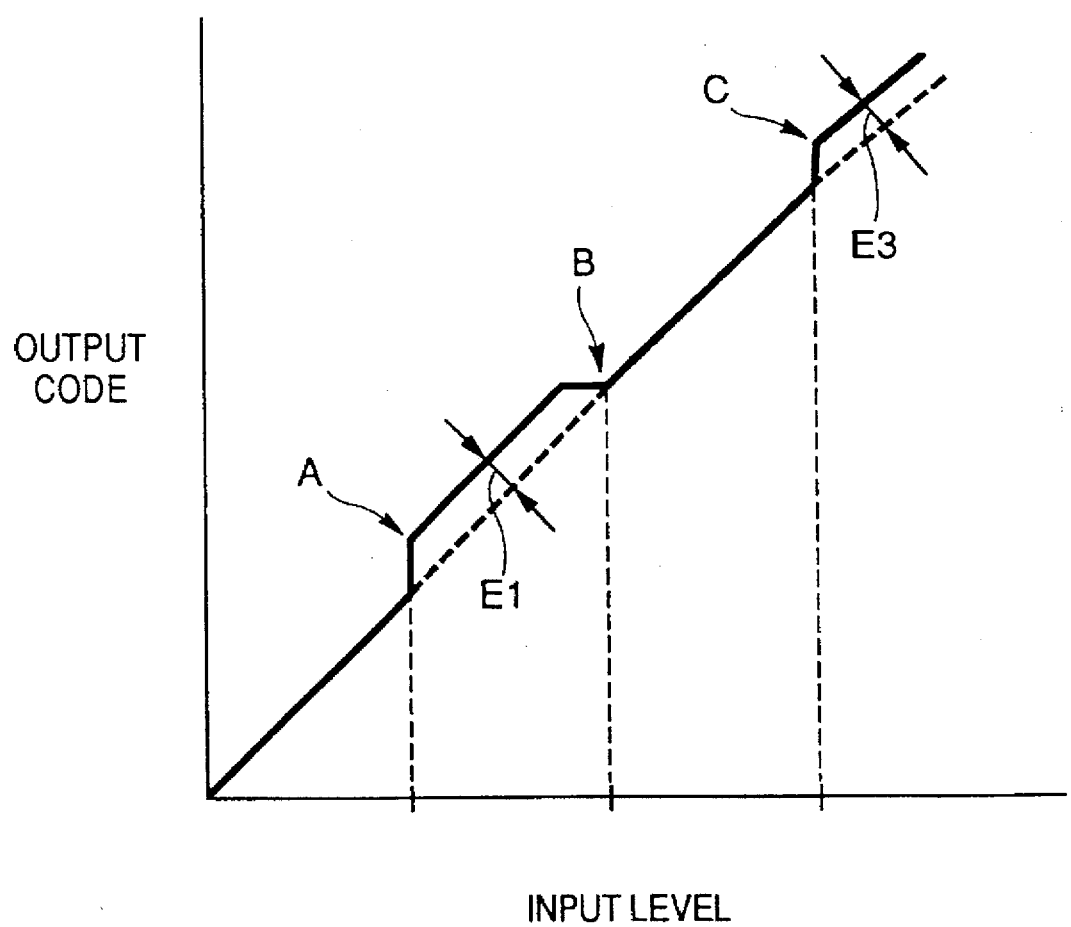
FIG. 17 is a characteristic diagram showing the operation of the A/D converter and A/D error correcting circuit shown in FIG. 16.
Figure 18:
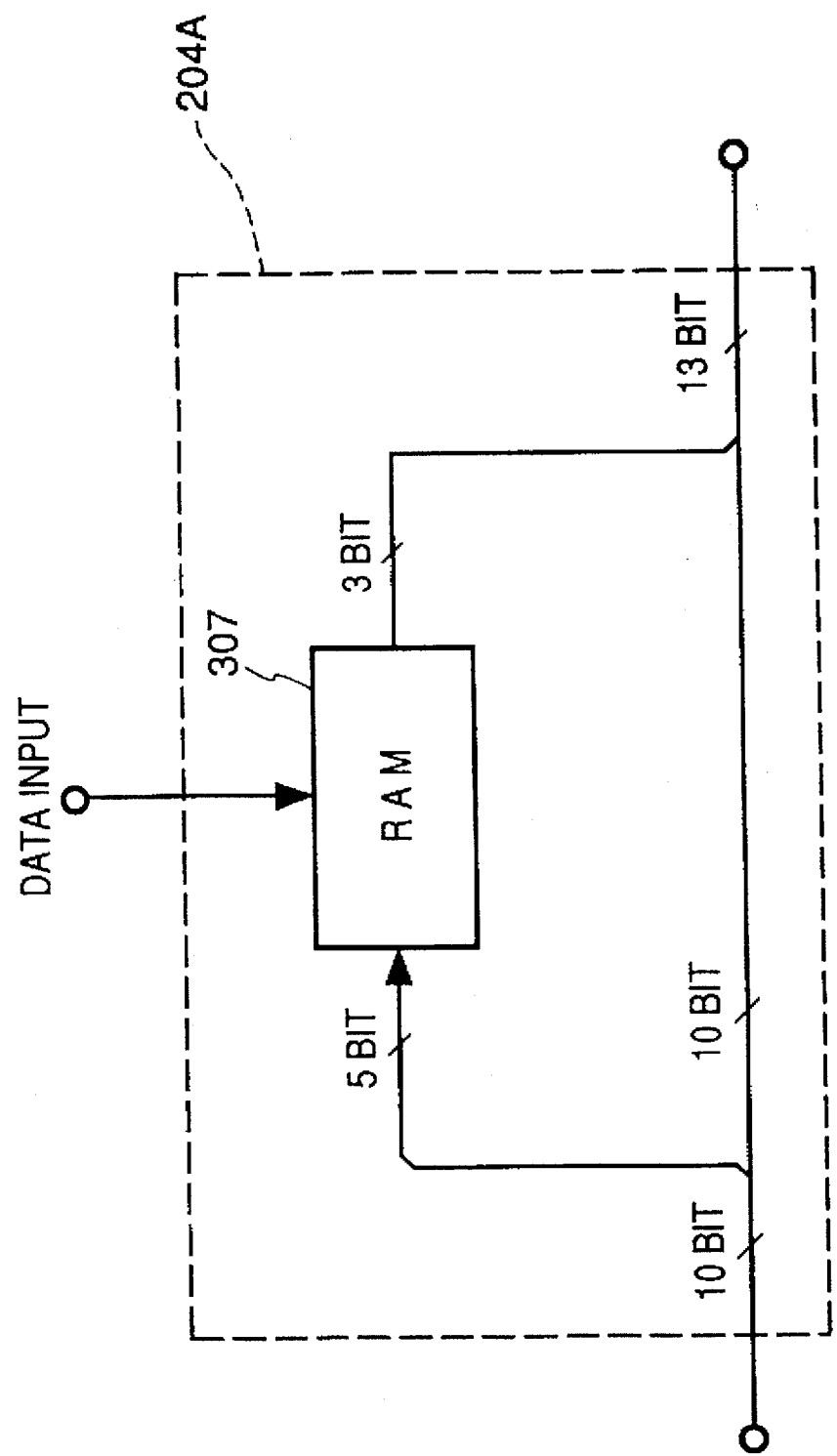
FIG. 18 is a block diagram illustrating the construction of another example of the A/D error correcting circuit in the image sensing apparatus shown in FIG. 15.

A seventh embodiment of the present invention will now be described with reference to FIGS. 15 through 18. FIG. 15 is a block diagram showing the construction of an image sensing apparatus according to a seventh embodiment of the invention, FIG. 16 is a block diagram showing the construction of an A/D converter and A/D error correcting circuit in the apparatus shown in FIG. 15, FIG. 17 is a characteristic diagram showing the operation of the A/D converter and A/D error correcting circuit shown in FIG. 16 and FIG. 18 is a block diagram illustrating the construction of another example of the A/D error correcting circuit in the apparatus shown in FIG. 15.

The apparatus shown in FIG. 15 includes a CCD 201 serving as a color image sensing element. Very small color-separating filters (hereinafter referred to as a "very small color filters") are arrayed on the photoelectric converting surface of the CCD 201. The image of the subject is color-separated by the very small color filters of the CCD 201 via an optical system (not shown), and the resulting image is formed on the image sensing surface of the CCD. This image is then subjected to a photoelectric conversion so that an image signal representing the image of the subject is outputted by the CCD 201. An S/H (sample-and-hold) circuit 202 is connected to the CCD 201 and converts the discontinuous image signal from the CCD 201 into a continuous signal. An A/D converter 203 is connected to the S/H circuit 202. The output signal of the A/D converter 203 enters an A/D error correcting circuit 204, which corrects for the conversion error of the A/D converter 203.

A color separating circuit 205 is connected to the A/D error correcting circuit 204 and converts the image signal from the A/D error correcting circuit 204 into color signals R, G, B (red, green, blue) of the three primary colors of light. The signals R, G, B enter processing circuits 206, 207, 208, respectively, connected to the color separating circuit 205.

The three primary-color signals R, G, B are subjected to such processing as a gamma correction, black clipping and white clipping in the respective processing circuits 206, 207, 208. The processed outputs of these circuits are applied to an encoder 209, which converts them into color-difference signals and applies modulation to form a modulated color-difference signal C.

An LPF (low-pass filter) 210 is connected to the A/D error correcting circuit 204 and extracts a brightness signal from the image signal provided by the A/D error correcting circuit 204. The brightness signal is processed by the processing circuit 211 connected to the LPF 210. The output signal of the processing circuit 211 and the modulated color-difference signal from the encoder 209 are added by an adder 212, and the output of the adder 212 enters a D/A converter 213 connected thereto. The D/A converter 213 produces an analog video signal delivered to an external device such as a VCR via the output terminal 214.

As shown in FIG. 16, the A/D converter 203 is provided with a higher-order comparator 301, a D/A converter 302, a subtractor 303 and a lower-order comparator 304. In order to perform a conversion of the higher-order bits, the output signal of the S/H circuit 202 is compared with a threshold value set in the higher-order comparator 301, which produces a higher-order code. Thus, the higher-order bit output signal from the higher-order comparator 301 is converted into an analog signal by the D/A converter 302 connected to the higher-order comparator 301, after which this analog signal is fed into the subtractor 303 connected to the D/A converter 302. Also applied to the subtractor 303 is the output of the S/H circuit 202. The subtractor 303 subtracts the higher-order bit signal, which has been converted into the analog signal, from the output signal of the S/H circuit 202.

The output signal thus obtained from the subtractor 303 enters the lower-order comparator 304 connected to the subtractor 303. In order to perform the conversion of the lower-order bits, the input signal to the lower-order comparator 304 is compared with a threshold value set within the comparator 304, which produces a lower-order code.

As shown in FIG. 16, the A/D error correcting circuit 204 has a memory 305 storing the conversion error of the A/D converter 203 and an adder 306. The output signal of the lower-order comparator 304 and the output signal of the higher-order comparator 301 enter the A/D error correcting circuit 204, in which the adder 306 adds the conversion error of the A/D converter 203 read out of the memory 305 to the output signal of the A/D converter 203. Thus, the A/D error correcting circuit 204 delivers an output signal, which has been corrected for the conversion error of the A/D converter 203, to the color separating circuit 205 and LPF 210.

In FIG. 17, the input level of the A/D converter 203 is plotted along the horizontal axis and the output code of the output code of the A/D converter 203 is plotted along the vertical axis. In the case where the higher- and lower-order bits are converted by the separate comparators, as shown in FIG. 16, a change is produced in the output code owing to the error in the threshold value of the higher-order comparator 301 and the error in the D/A converter 302 of the higher-order bits, etc., as shown at A, B and C in FIG. 17. For example, if the output of the A/D converter 203 is ten bits and the outputs of the higher- and lower-order comparators 301, 304 are five bits each, then, in a case where the input voltage is increased continuously, as shown in FIG. 17, the higher-order comparator 301 changes at the point where the lower-order comparator 304 changes by 32 levels. As a result, errors indicated at E1, E3 are produced every 32 LSB.

If the image is comparatively flat, these errors appear as stripe-shaped deterioration referred to as a "false contour". Accordingly, in this embodiment, complimentary numbers of errors E1, E3 are stored in the memory 305 and the complimentary numbers are added to the output signal of the A/D converter 203 to correct for the errors. In actuality, the five higher-order bits, for example, contained in the input signal enter as the address of the memory 305, and a signal of three bits as the lower-order bits of the output signal are delivered by the memory 305. As for the other ten bits, the input signal is outputted as is and the corrective data of three bits is added to the lower-order bits of the input signal by the adder circuit 306.

FIG. 18 is a block diagram illustrating the construction of another example of the A/D error correcting circuit in this embodiment. Here an A/D error correcting circuit 204A is provided with a read/write RAM (random-access memory) 307. Corrective data is stored in the RAM 307 in advance when, say, the power supply is turned on. Five higher-order bits, by way of example, contained in the input signal enter the RAM 307 as an address. The RAM 307 outputs a signal on the order of three bits as lower-order bits of the output signal. As for the other ten bits, the input signal is outputted as is and the corrective data of three bits is added to the lower-order bits of the input signal. Ordinarily, the error of the A/D converter is less than 1 LSB and therefore no practical problems are encountered even if the maximum amount of correction is 1 LSB.

Thus, in accordance with this embodiment, the conversion error of the A/D converter 203 is corrected by a simple circuit arrangement without disturbing the conversion accuracy of the A/D converter 203. This provides an image signal having a high picture quality. As a result, it is possible to provide a high-performance image sensing apparatus at low cost.

(Eighth Embodiment)

Figure 19:
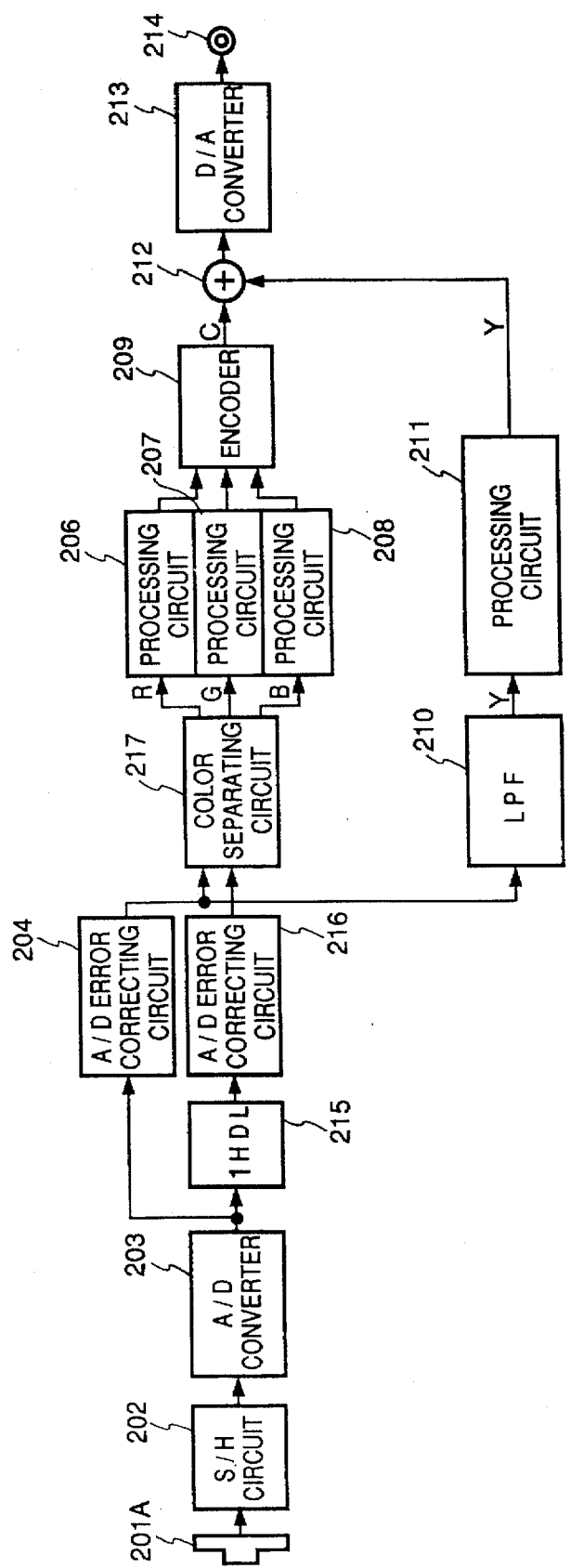
FIG. 19 is a block diagram illustrating the construction of an image sensing apparatus according to an eighth embodiment of the invention.

An eighth embodiment will now be described with reference to FIG. 19. FIG. 19 is a block diagram showing the construction of the image sensing apparatus of this embodiment. Portions identical with those of the seventh embodiment described above are designated by like reference numerals.

As shown in FIG. 19, a CCD 201A used in this embodiment has an array of very small color filters different from that of the CCD 201 in the seventh embodiment described above. Specifically, the CCD 201A is provided with an array of very small filters of vertical-correlation type, in which the three primary-color signals R, G, B are separated using a signal of two horizontal intervals. Further, in this embodiment, a 1 HDL (a delay line for a delay of one horizontal period) 215 and an A/D error correcting circuit 216 are provided anew. The A/D error correcting circuit 216 is connected to the output terminal of the A/D converter 203 via the 1HDL 215, and a color separating circuit 217 is connected to the output terminal of the A/D error correcting circuit 216.

The CCD 201A produces an image signal representing the image of a subject. This signal is converted into a digital signal by the A/D converter 203, and the digital signal enters the A/D error correcting circuit 204, as in the seventh embodiment described above. At the same time, the digital signal enters the A/D error correcting circuit 216 via the 1HDL 215. In this embodiment, the three primary-color signals R, G, B are separated in the color separating circuit 217 by correlation processing of the input signal of two horizontal intervals. Thereafter, a video signal is produced and delivered to an external device from the output terminal 214 in the same manner as described in connection with the seventh embodiment.

Thus, in accordance with this embodiment, the conversion error of the A/D converter 203 is corrected by a simple circuit arrangement using the 1HDL for color separation without disturbing the conversion precision of the A/D converter 203. This provides an image signal having a high picture quality. As a result, it is possible to provide a high-performance image sensing apparatus at low cost.

Other elements and operations in this embodiment are identical with those of the seventh embodiment and need not be described again.

(Ninth Embodiment)

A ninth embodiment will now be described with reference to FIG. 20, which is a block diagram illustrating the construction of an image sensing apparatus according to this embodiment. Portions identical with those of the seventh embodiment are designated by like reference numerals.

Figure 20:
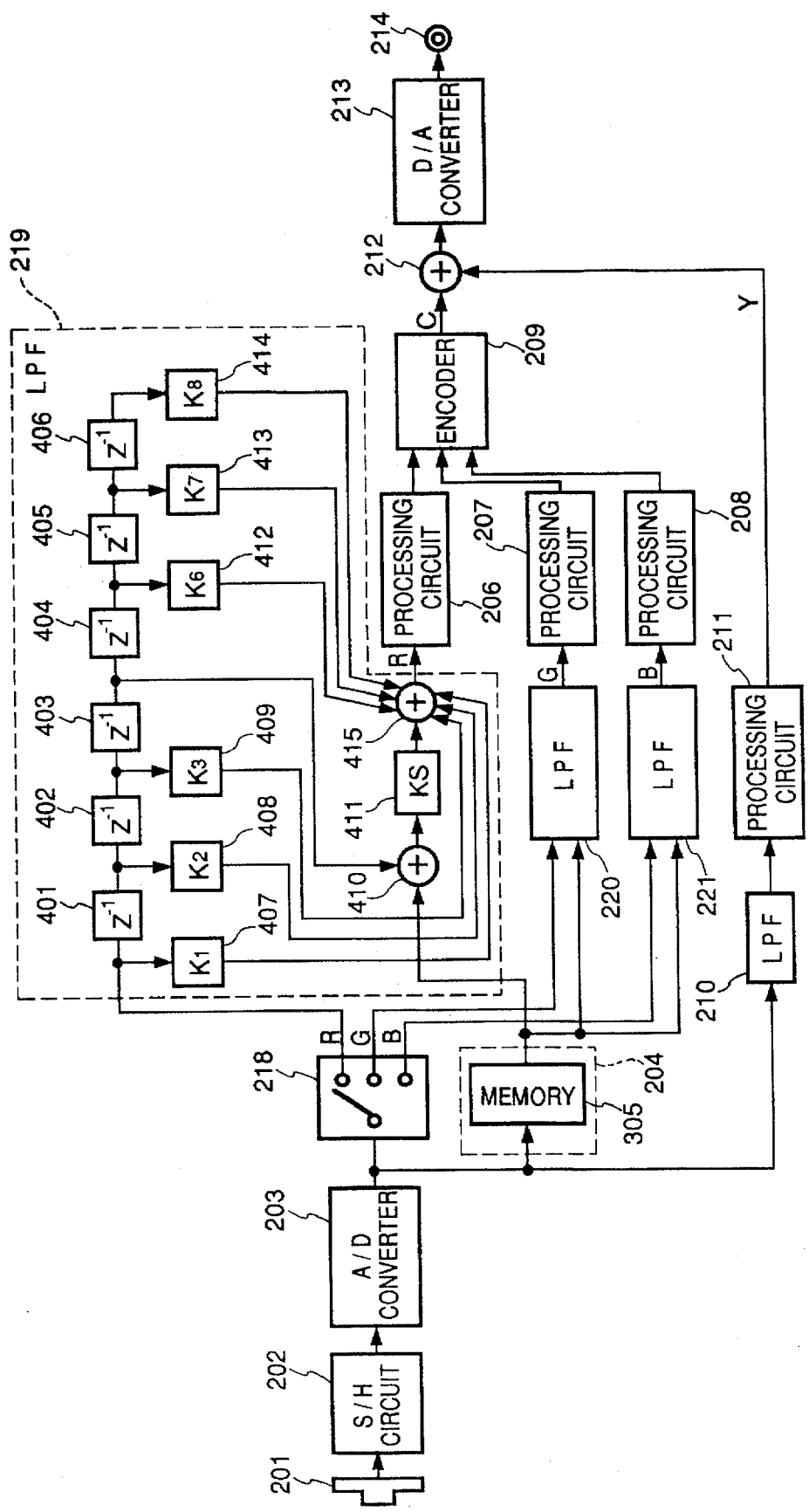
FIG. 20 is a block diagram illustrating the construction of an image sensing apparatus according to a ninth embodiment of the invention.

In this embodiment, as illustrated in FIG. 20, the CCD 201 having the array of very small color filters identical with that of the seventh embodiment is used. The image pick-up signal representing the image of the subject from the CCD 201 is converted into a digital signal by the A/D converter 203. This signal is applied to a switch 218. The three primary-color signals R, G, B are obtained from the switch 218, which is changed over in accordance with the array of very small color filters of the CCD 201. The signals, R, G, B enter LPFs 219, 220, 221, respectively. The output signal of the A/D converter 203 enters a memory 305 as an address, corrective data is outputted by the memory 305 and this data enters the LPFs 219, 220, 221.

The LPFs 219, 220, 221 are identically constructed FIR (finite impulse response) filters. The LPF 219 will be described as a representative example. The LPF 219 includes serially connected registers 401–406. The junction of the registers 403 and 404 and the output terminal of the memory 305 are connected to an adder 410. Input terminals of coefficient units 407 and 414 are connected to the input terminal of the register 401, to which the red color signal R is applied, and the output terminal of the register 406, respectively. The input terminals of coefficient units 408, 409 are connected to the junctions between registers 401, 402 and 402, 403, respectively, and the input terminals of coefficient units 412, 413 are connected to the junctions between registers 404, 405 and 405, 406, respectively. The output terminals of the coefficient units 407–409 and the output terminals of the coefficient units 412–414 are connected to an adder 415. The output terminal of the adder 410 is connected to an adder 415 via a coefficient unit 411.

With regard to the red color signal R, for example, the adder 410 adds the corrective data from the memory 305 to the output signal of the register 403 to correct for error. The output of the adder 415 is applied to the processing circuit 206, where it is subjected to such processing as a gamma correction, black clipping and white clipping. The processed signal from the processing circuit 206 is applied to the encoder 209 connected thereto. The green color signal G and blue color signal B are similarly processed and then applied to the encoder 209. The latter converts the three primary-color signals R, G, B into color-difference signals.

The output signal of the A/D converter 203 enters the LPF 210 connected to the A/D converter 203. The LPF 210 outputs a brightness signal, which is processed by the processing circuit 211 connected to the LPF 210. The output signal of the processing circuit 211 and the modulated color-difference signals from the encoder 209 are added by the adder 212, whose output enters the D/A converter 213.

The latter outputs a video signal to an external device such as a VTR via the output terminal 214.

Thus, in accordance with this embodiment, the conversion error of the A/D converter is corrected by a simple circuit arrangement using the LPFs for color separation. This provides an image signal having a high picture quality. As a result, it is possible to provide a high-performance image sensing apparatus at low cost.

Other elements and operations in this embodiment are identical with those of the seventh embodiment and need not be described again.

(Tenth Embodiment)

A tenth embodiment will now be described with reference to FIG. 21, which is a block diagram illustrating the construction of an A/D converter and A/D error correcting circuit in an image sensing apparatus according to this embodiment.

Figure 21:
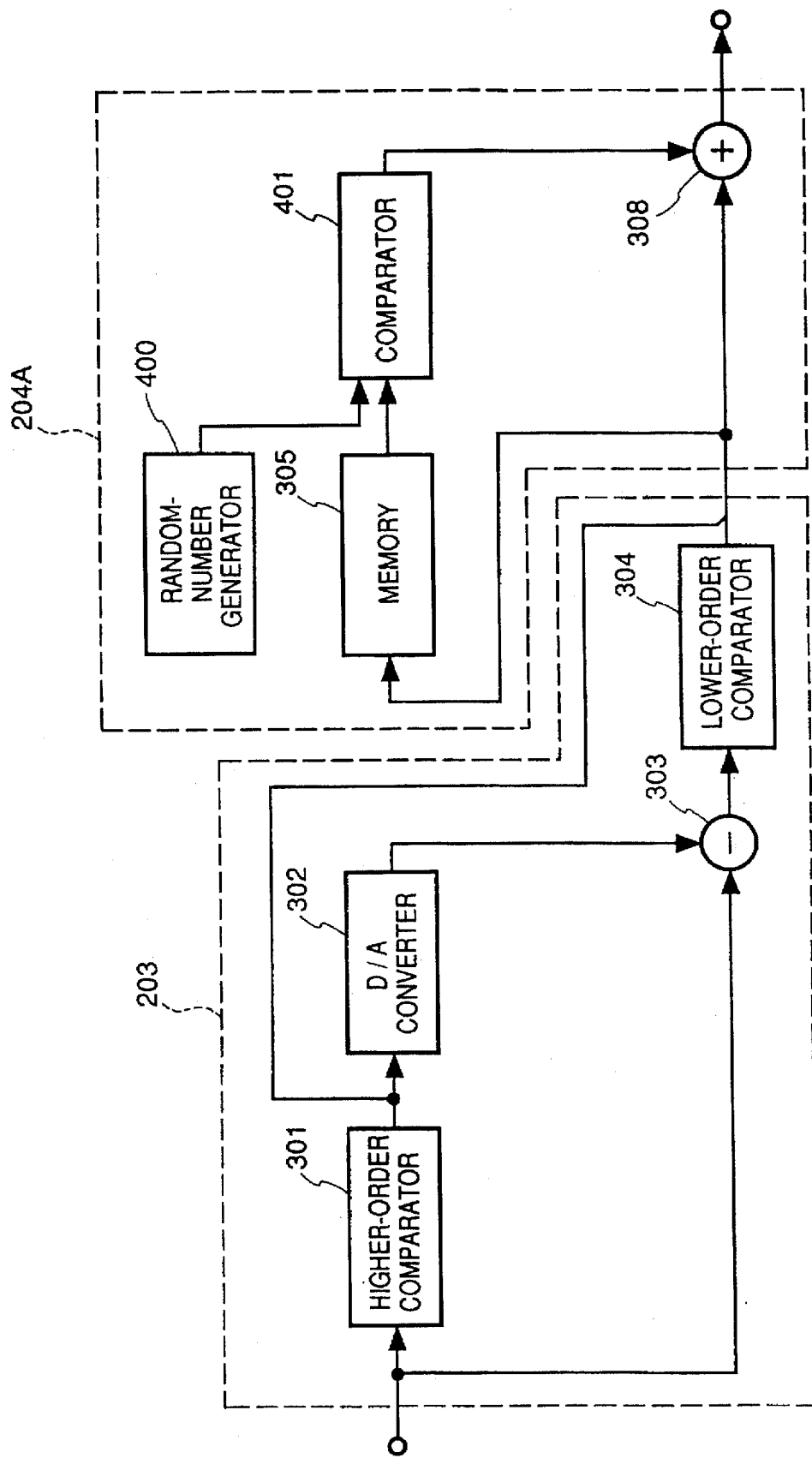
FIG. 21 is a block diagram illustrating the construction of an image sensing apparatus according to a tenth embodiment of the invention.

As shown in FIG. 21, this embodiment differs from the seventh embodiment in the construction of the A/D error correcting circuit, designated by 204A. Specifically, the output signal of the A/D converter 203 enters an adder 308 and is applied as an address to the memory 305, which stores the conversion error of the A/D converter 203. Corrective data outputted by the memory 305 and the output of a random-number generator 400 are compared by a comparator 401. The output signal of the comparator 401 and the output signal of the A/D converter 203 are added by the adder 308, whose output signal becomes the output of the A/D error correcting circuit 204A. As in the case of the seventh embodiment, this signal enters the color separating circuit 205 and the LPF 210.

Figure 22:
FIG. 22 is a characteristic diagram showing the operation of a random-number generator in the image sensing apparatus shown in FIG. 21.
Figure 23:
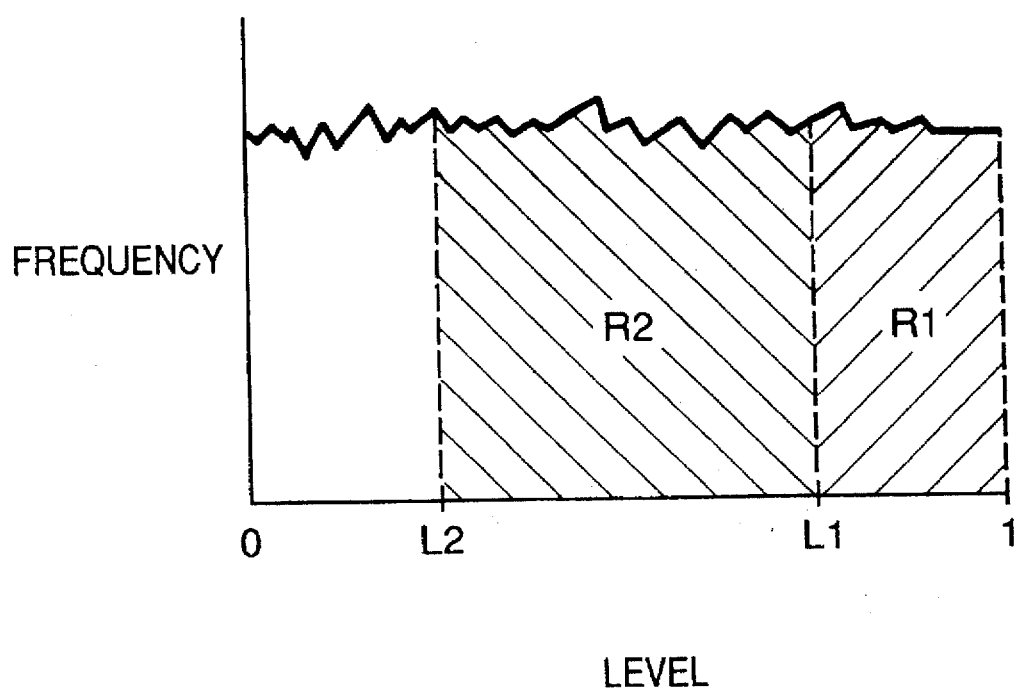
FIG. 23 is a characteristic diagram showing a frequency distribution of output levels of the random-number generator.
Figure 24A:
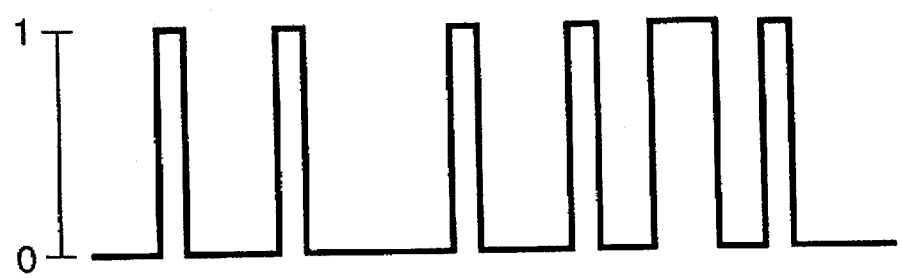
FIGS. 24A and 24B are characteristic diagrams showing the operation of a comparator in the image sensing apparatus of FIG. 21.

FIGS. 22 through 24 are characteristic diagrams illustrating the operation of the A/D converter and A/D error correcting circuit shown in FIG. 21. The random-number generating unit 400 outputs a random-number signal of the kind shown in FIG. 22. The frequency distribution of the output level of the random-number generator 400 has the characteristic depicted in FIG. 23, which shows that the frequency of the level from 1 to 0 is a substantially uniform random-number distribution. In a case where the output data of the memory 305 is comparatively large, the output signal of the comparator 401 is as shown in FIG. 24A. If the output signal of the memory 305 is at a level of L1 in FIG. 23, a pulsed output having a frequency corresponding to the integrated value of a portion R1 on the right side of L1 is obtained from the comparator 401.

Figure 24B:
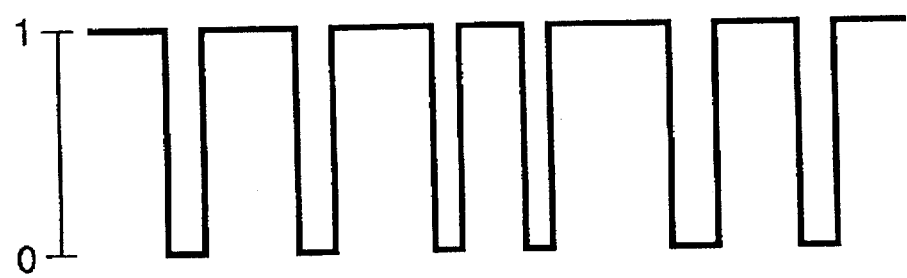

In a case where the output data of the memory 305 is comparatively small, the output signal of the comparator 401 is as shown in FIG. 24B. If the output signal of the memory 305 is at a level of L2 in FIG. 23, a pulsed output having a frequency corresponding to the integrated value of portions R2 and R1 on the right side of L2 is obtained from the comparator 401.

The data thus obtained is added to the output signal of the A/D converter 203, whereby the correction of the conversion error of A/D converter 203 is carried out. In actuality, the method employed here involves adding the output of the comparator 401 to the LSB of the output from the A/D converter 203 using the adder 308, in which the address of the memory 305 is composed of five bits, which is the same as the number of bits of the higher-order comparator 301 of the A/D converter 203, the data is composed of four bits, the output of the random-number generator 400 is composed of four bits and the output of the comparator 401 is one bit.

Figure 25:
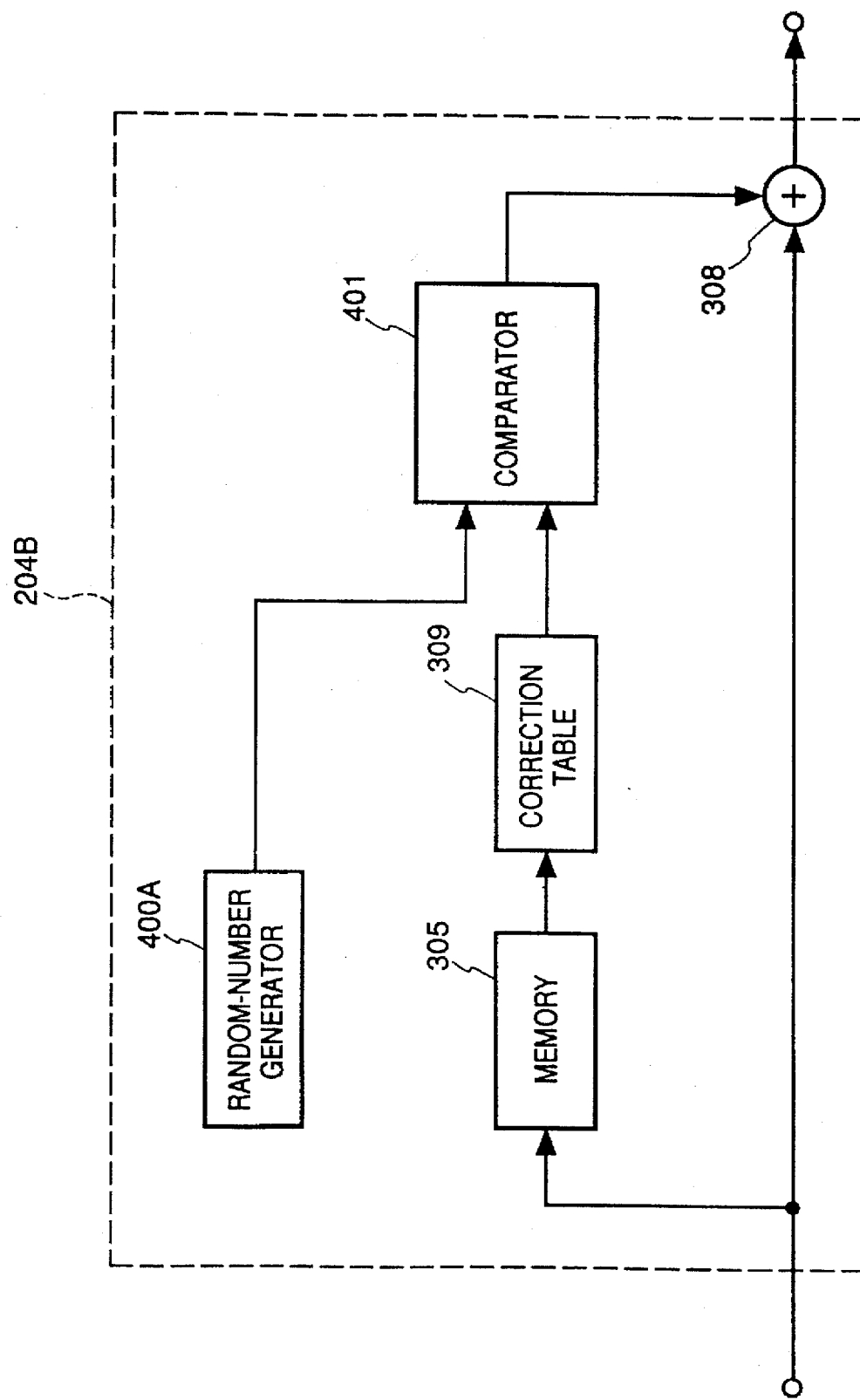
FIG. 25 is a block diagram showing the construction of another example of an A/D error correcting circuit in the image sensing apparatus of FIG. 21.

FIG. 25 is a block diagram illustrating the construction of an A/D error correcting circuit in an image sensing apparatus according to this embodiment. In this embodiment, the memory 305 is connected to the comparator 401 via a correction table 309. A random-number generator 400A in FIG. 25 differs from the random-number generator 400 of FIG. 21 in terms of the frequency distribution of its output level. Here the random-number generator 400A generates random numbers having a normal distribution. In this case also the output signal of the A/D converter 203 enters the memory 305 as an address, and the output of the memory 305 enters the correction table 309 so as to be corrected by an internal table. The output of the correction table 309 and the output of the random-number generator 400A are compared by a comparator 401, and the output signal of the comparator 401 and the output from the A/D converter 203 are added by the adder 308, whereby the conversion error of the A/D converter 203 is corrected.

Figure 26A:
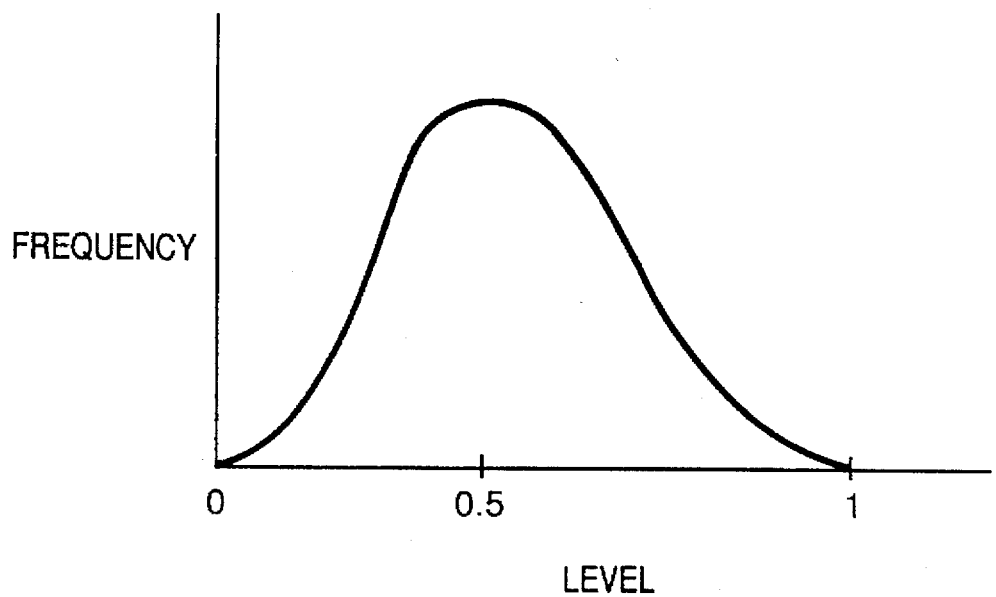
FIGS. 26A and 26B are characteristic diagrams showing the operation of the A/D error correcting circuit shown in FIG. 25.
Figure 26B:
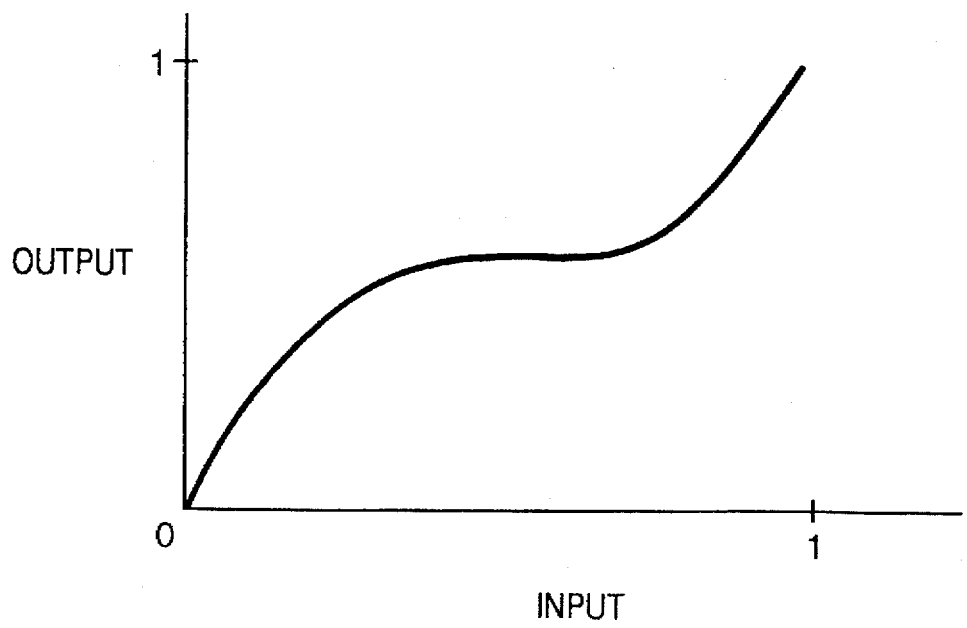

FIGS. 26A and 26B are characteristic diagrams showing the operation of the A/D error correcting circuit 204A illustrated in FIG. 25. The level frequency distribution of the output signal from the random-number generator 400A is a normal distribution centered on level 0.5, as illustrated in FIG. 26A. The input/output characteristic of the correction table 309 is as shown in FIG. 26B. The table characteristic is set in such a manner that the input/output characteristic will become linear when the level of the output signal is integrated in FIG. 26A. In actuality, the method employed here involves adding the output of the comparator 401 to the LSB of the output from the A/D converter 203 using the adder 308, in which the address of the memory 305 is composed of five bits, which is the same as the number of bits of the higher-order comparator 301 of the A/D converter 203, the data is composed of four bits, the input/output of the correction table 309 is composed of four bits, the output of the random-number generator 400A is composed of four bits and the output of the comparator 401 is one bit.

Figure 27:
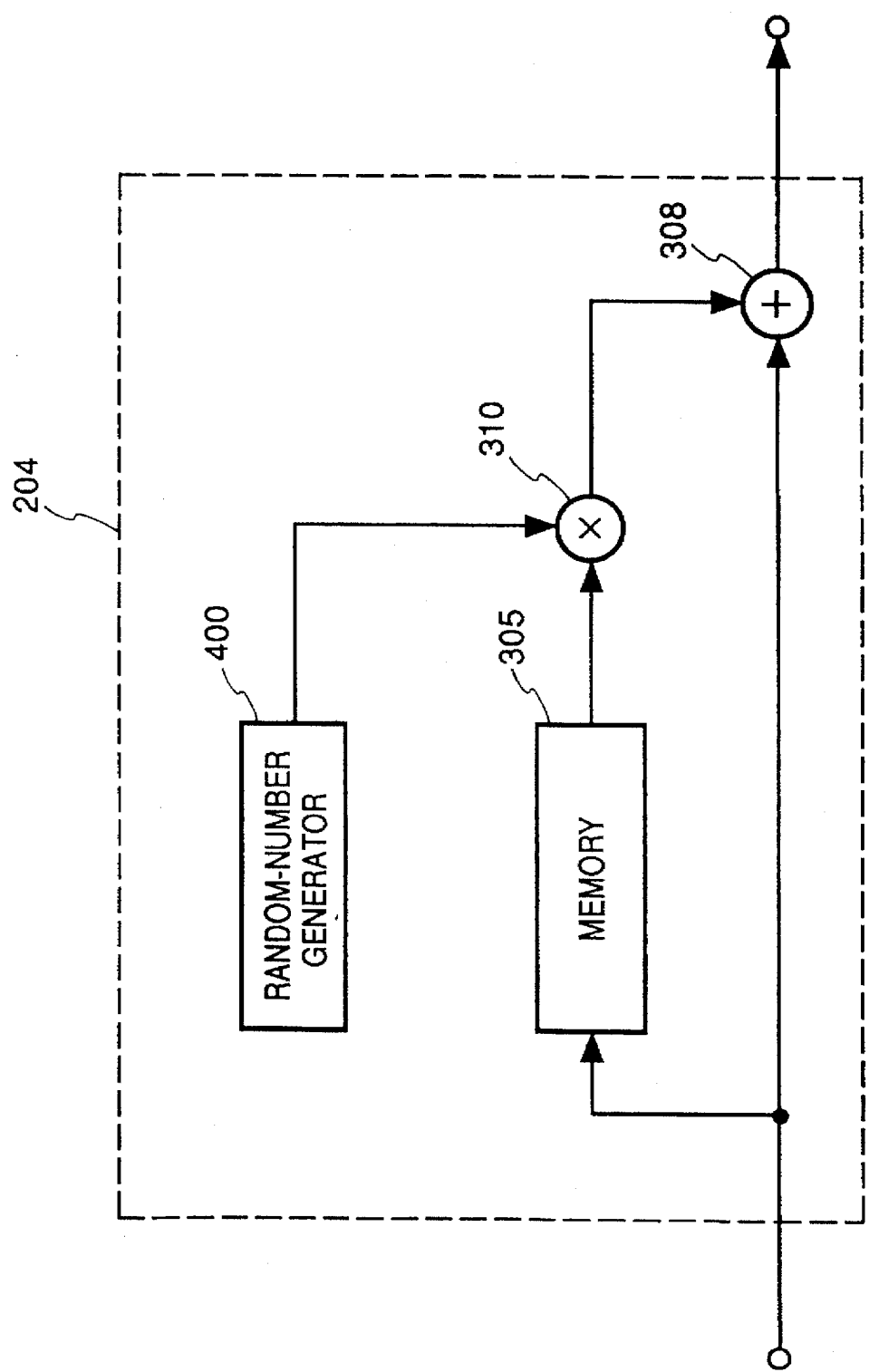
FIG. 27 is a block diagram showing the construction of a further example of an A/D error correcting circuit in the image sensing apparatus of FIG. 21.

FIG. 27 is a block diagram illustrating the construction of another example of A/D error correcting circuit 204 in the image sensing apparatus according to this embodiment. The output signal of the random-number generator 400 and the output signal of the memory 305 are multiplied together by a multiplier 310, and the output signal of the multiplier 310 is added to the output signal of the A/D converter 203 by the adder 308. In this case, the random-number generator 400 used is the same as that shown in FIG. 21. However, it is possible to use the random-number generator 400A employed in FIG. 25.

Figure 28A:
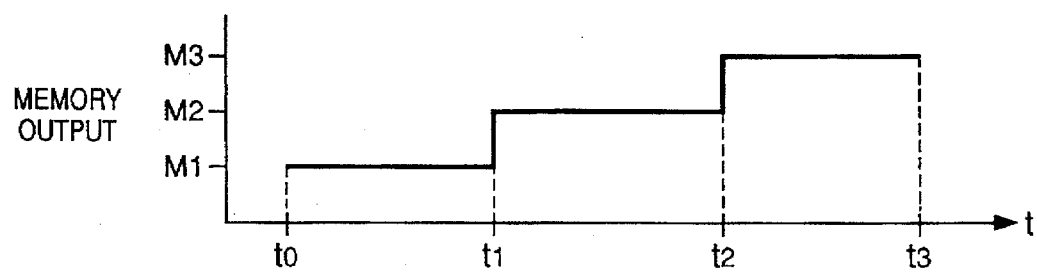
FIGS. 28A and 28B are characteristic diagrams showing the operation of the A/D error correcting circuit shown in FIG. 27.
Figure 28B:
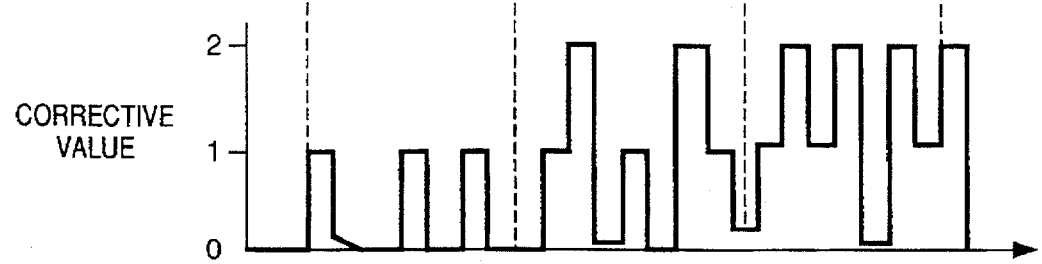

FIGS. 28A and 28B are characteristic diagrams illustrating the operation of the A/D error correcting circuit 204 shown in FIG. 27. Time is plotted along the horizontal axis in FIG. 28A, and the output signal of the memory 305 is plotted along the vertical axis. The output signal of the memory 305 is M1, M2 and M3 and time periods $t_0$~$t_1$, $t_1$~$t_2$ and $t_2$~$t_3$, respectively. The output signal of the multiplier 310 is a corrective value. As shown in FIG. 28B, the average value of the corrective value becomes larger in conformity with the outputs M1, M2, M3 of the memory 305.

In actuality, the method employed here involves adding the output of the multiplier 310 to the LSB of the output from the A/D converter 203 using the adder 308, in which the address of the memory 305 is composed of five bits, which is the same as the number of bits of the higher-order comparator 301 of the A/D converter 203, the data is composed of four bits, the output of the random-number generator 400 is composed of four bits and the output of the multiplier 310 is composed of two bits.

Thus, in accordance with this embodiment, the conversion error of the A/D converter is corrected by a simple circuit arrangement that makes selective use of a random-number generator having little adverse effect upon the image. This provides an image signal having a high picture quality. As a result, it is possible to provide a high-performance image sensing apparatus at low cost.

Other elements and operations in this embodiment are identical with those of the seventh embodiment and need not be described again.

In accordance with the image sensing apparatus of the seventh through tenth embodiments, as described above, an image signal outputted by an image sensing element is converted into a digital signal by an A/D converter, this is corrected by corrective data synthesized by a correcting circuit connected to the output terminal of the A/D converter, and the corrective output signal of the A/D converter is subjected to signal processing by video-signal forming means, whereby a video signal is produced. As a result, the conversion error of the A/D converter is corrected by a simple circuit arrangement, an image signal having a high picture quality can be obtained and manufacturing cost can be reduced.

(11th Embodiment)

Figure 29:
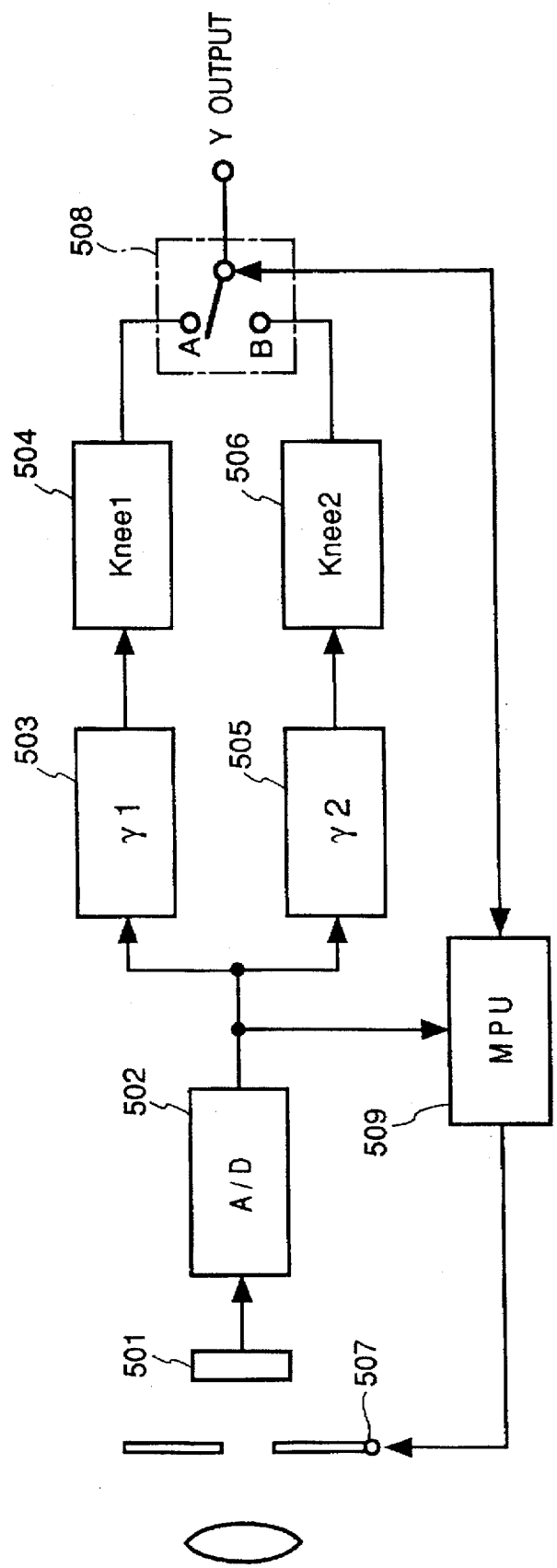
FIG. 29 is a diagram showing the construction of an image sensing apparatus for describing an 11th embodiment of the present invention.

FIG. 29 illustrates an 11th embodiment of an image sensing apparatus according to the present invention. The apparatus includes a CCD image sensing element 501, an A/D converter 502, a first γ circuit 503, a first knee circuit 504, a second γ circuit 505, a second knee circuit 506, a diaphragm 507 for adjusting the amount of light incident upon the CCD image sensing element 501, a switch 508 for selecting the first γ circuit 503 and first knee circuit 504 or the second γ circuit 505 and second knee circuit 506 in dependence upon an output from the A/D converter 502, and a microprocessor 509 for detecting the output of the A/D converter 502 and controlling the diaphragm 507 and switch 508.

The operation of the image sensing apparatus of this embodiment will now be described.

When power is introduced, the diaphragm 507 is placed in the open state and the switch 508 is connected to the terminal on a B side. Further, ⅔ of the output range of the A/D converter 502 is allocated to the γ characteristic. Accordingly, at this time a video signal having a large amplitude is converted into a digital image pick-up signal by the A/D converter 502, and the signal is subjected to a γ conversion by a γ characteristic having a wide range.

When the image sensing apparatus is in the operating state, the microprocessor 509 is constantly monitoring the output signal level of the A/D converter 502. When it is sensed that the output of the A/D converter 502 has saturated to an output level 1023 of the A/D converter in a prescribed period of time, the microprocessor 509 outputs a control signal to narrow down the diaphragm 507 and change over the switch 508 to the terminal on the A side.

Figure 30:
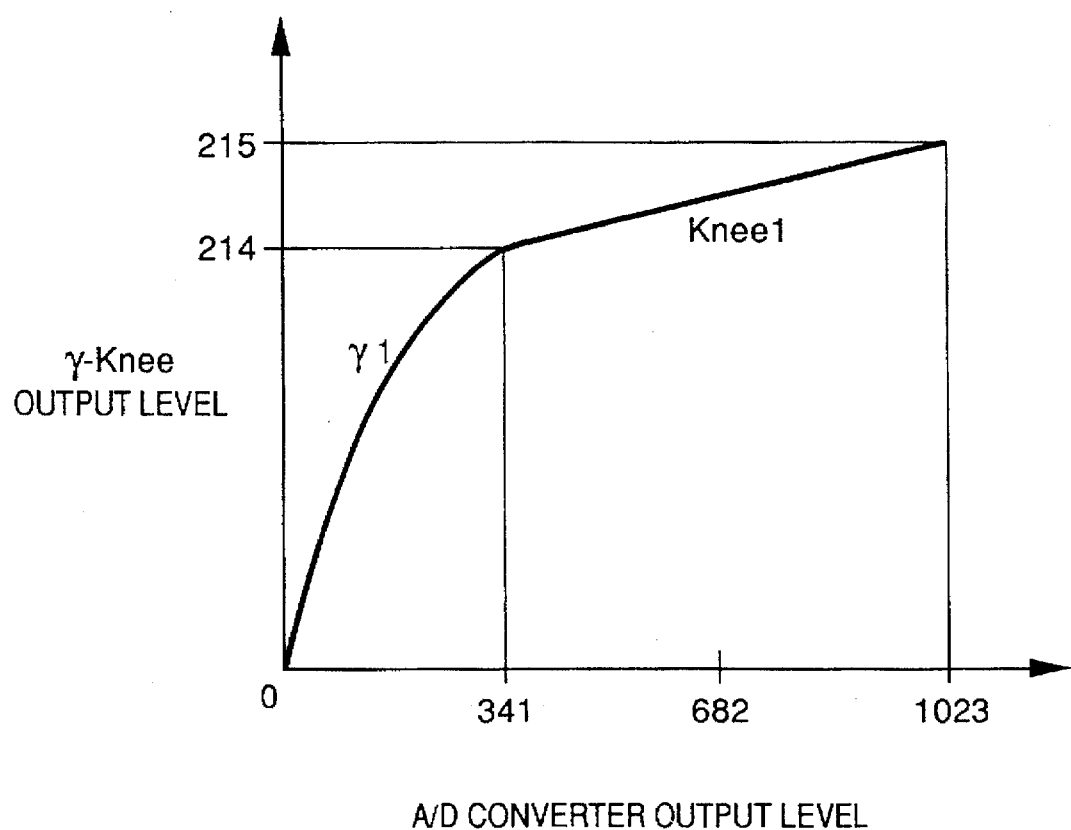
FIG. 30 is a characteristic diagram showing the relationship between a γ-knee output level and the output level of an A/D converter.

The conversion characteristic of the first γ circuit 503 and first knee circuit 504 is as shown in the characteristic diagram of FIG. 30. As mentioned above, ⅓ of the output range of the A/D converter 502 is allocated to the γ characteristic and the remaining ⅔ is allocated to the knee characteristic. In a case where the output of the A/D converter 502 does not exceed an output level 341 of the A/D converter in a prescribed period of time under these conditions, the microprocessor 509 outputs the control signal to open the diaphragm 507 and change over the switch 508 to the B terminal.

(12th Embodiment)

Figure 32:
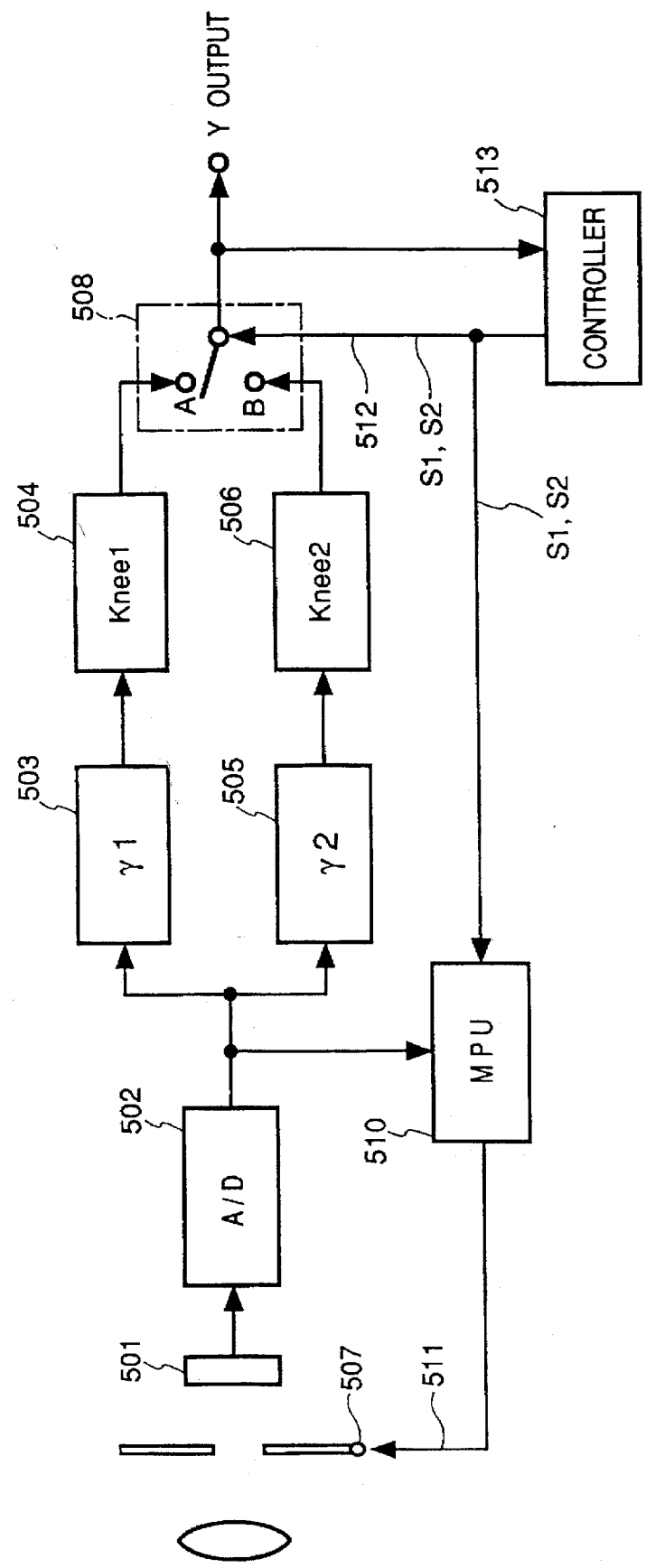
FIG. 32 is a block diagram illustrating the construction of an image sensing apparatus according to a 12th embodiment of the invention.

FIG. 32 illustrates a 12th embodiment of an image sensing-apparatus according to 12th embodiment of the invention. The apparatus includes the CCD image sensing element 501, the A/D converter 502, the first γ circuit 503, the first knee circuit 504, the second γ circuit 505, the second knee circuit 506, the diaphragm 507, a control circuit 513 for generating a control signal in dependence upon outputs from the first γ circuit 503, first knee circuit 504, second γ circuit 505 and second knee circuit 506, the switch 508 for selecting the first γ circuit 503 and first knee circuit 504 or the second γ circuit 505 and second knee circuit 506 in dependence upon a control output from the control circuit 513, the diaphragm 507 for adjusting the amount of light incident upon the CCD image sensing element 501, the microprocessor 510, a control line 511 used to operate the diaphragm 507, and a control line 512 for changing over the switch 508.

The operation of the image sensing apparatus of this embodiment will now be described.

Figure 31:
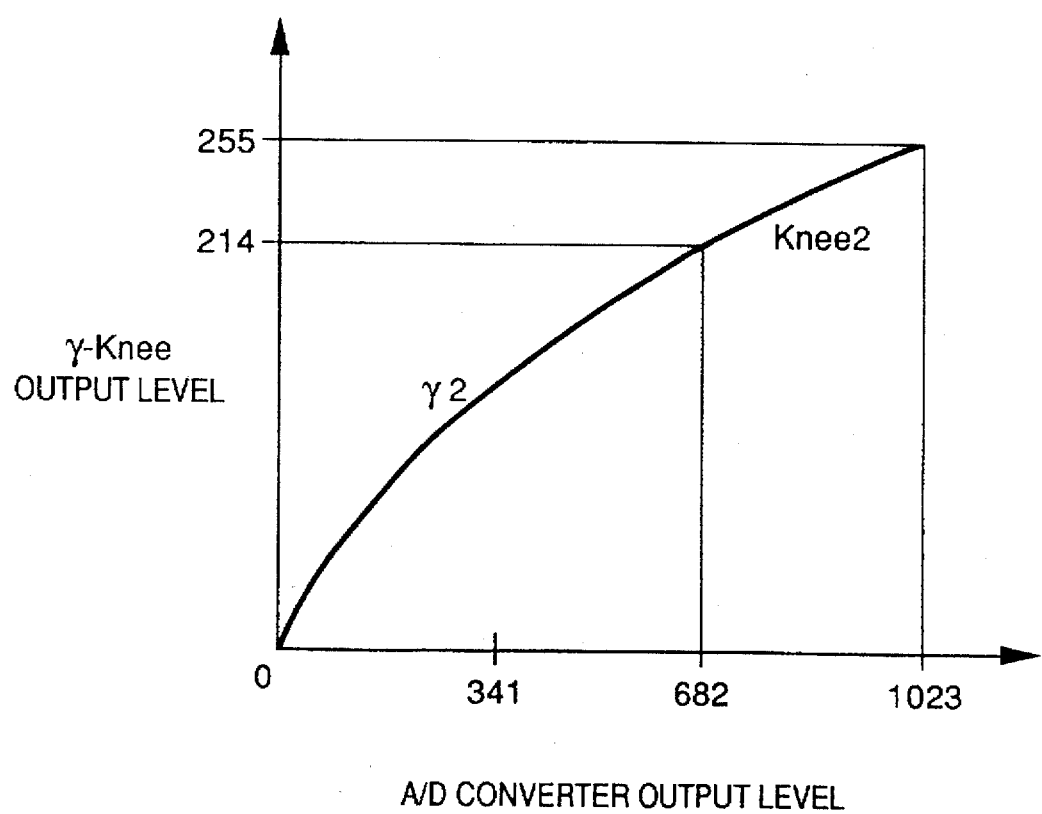
FIG. 31 is a characteristic diagram showing the relationship between a γ-knee output level and the output level of an A/D converter.

When power is introduced, the diaphragm 507 is placed in the open state and the switch 508 is connected to the B terminal. The conversion characteristic of the second γ circuit 505 and second knee circuit 506 is as shown in the characteristic diagram of FIG. 31.

Accordingly, at this time a video signal having a large amplitude is converted into a digital image pick-up signal by the A/D converter 502, and the signal is subjected to a γ conversion by a γ characteristic having a wide range. When it is sensed that the outputs of the second γ circuit 505 and second knee circuit 506 have saturated to an output level 255 of the A/D converter in a prescribed period of time, the control circuit 513 sends a control signal S1 to the switch 508 through the control line 512 to change over the movable terminal of the switch 508 to the A terminal.

At this time the control signal S1 obtained from the control circuit 513 is sent also to the microprocessor 510. Upon receiving the control signal S1, the microprocessor 510 operates to narrow down the diaphragm 507 through the control line 511. The conversion characteristic of the first γ circuit 503 and first knee circuit 504 is as shown in the characteristic diagram of FIG. 30. In a case where the outputs of the first γ circuit 503 and first knee circuit 504 do not exceed an output 213 of the A/D converter in a prescribed period of time, the control circuit 513 sends a control signal S2 to the switch 508.

As a result, the switch 508 is changed over to the B side. The control signal S2 obtained from the control circuit 513 is sent also to the microprocessor 510 at this time. Upon receiving the control signal S2, the microprocessor 510 operates to open the diaphragm 507 through the control line 511.

(13th Embodiment)

A 13th embodiment of the image sensing apparatus of the invention will now be described in detail with reference to FIG. 33. As is well known, A/D converters include those of the so-called two-step parallel type.

Figure 38:
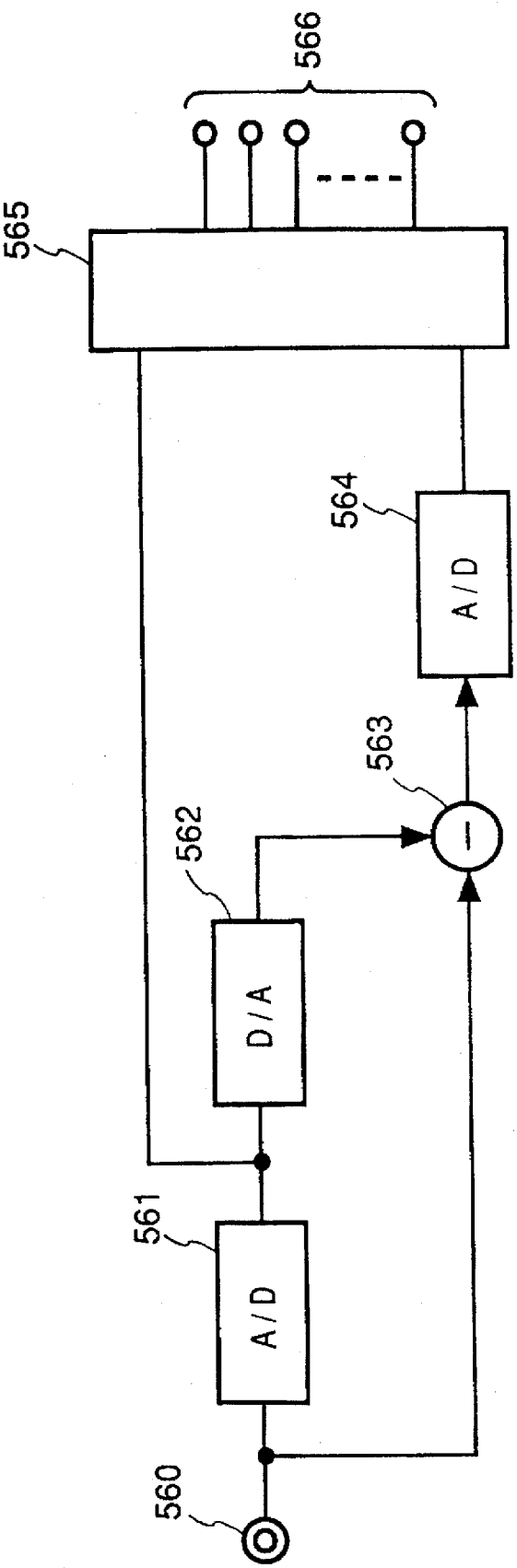
FIG. 38 is a block diagram showing a two-step parallel-type A/D converter.

As shown in FIG. 38, a two-step parallel-type A/D converter includes a first A/D converter 561 that decides n-number of higher-order bits of a signal entering from a signal input terminal 560, and a second A/D converter 564 that decides m-number of lower-order bits by digitally converting the difference between the converted output of the A/D converter 561 and the input analog signal.

Further, numeral 563 in FIG. 38 denotes a subtractor, 564 a D/A converter, 565 a logic circuit and 566 a digital output terminal.

If the first A/D converter 561 that decides the n-number of higher-order bits in the two-step parallel-type A/D converter thus constructed contains an error, then the overall conversion characteristic also will contain a step-shaped error, as shown in FIG. 39. As a consequence, the digital image will develop a false contour if this A/D converter is used in the digital conversion of an image signal.

The present embodiment is adapted as described below in order to solve this problem and raise the conversion precision of the A/D converter.

Figure 33:
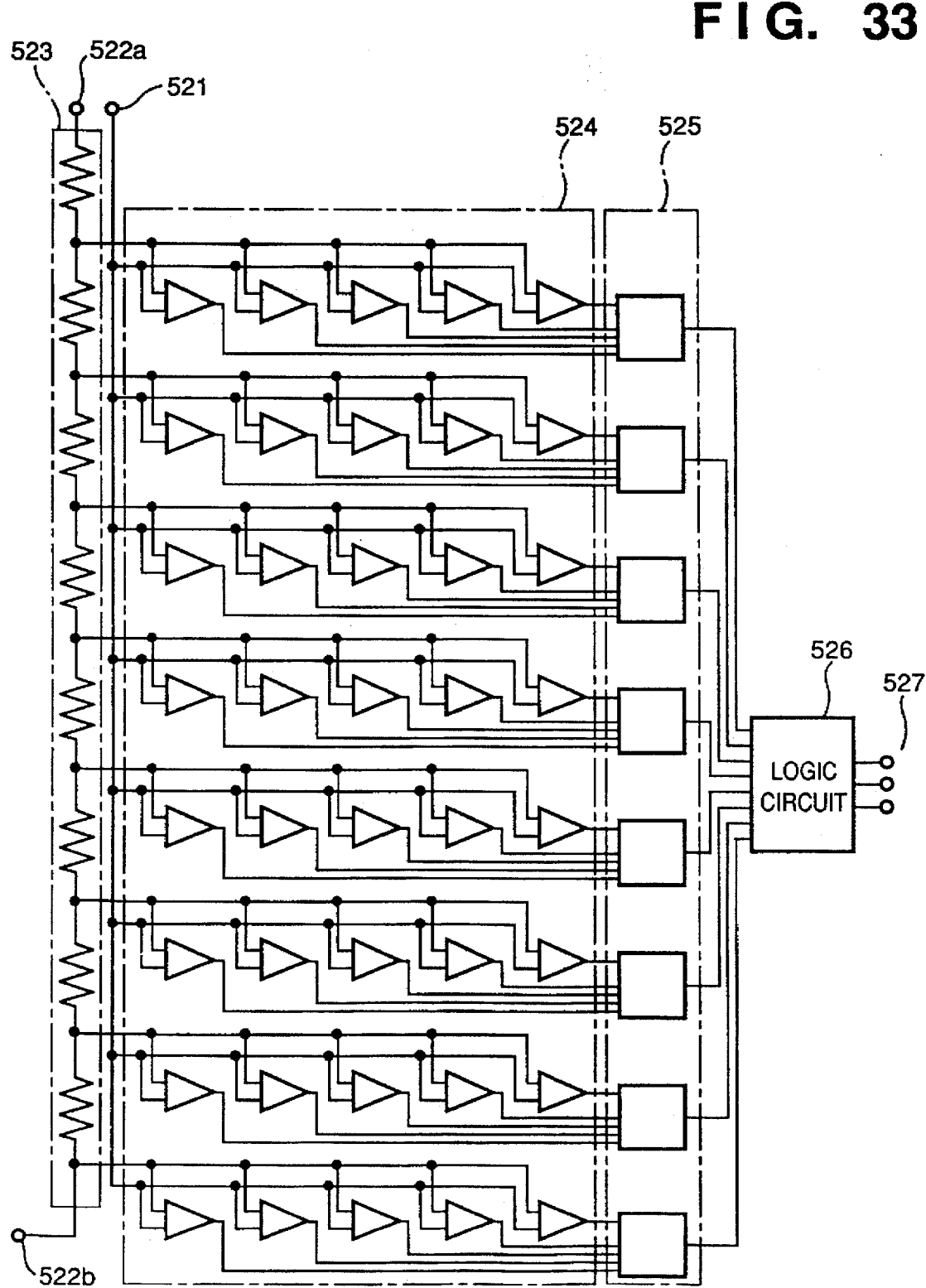
FIG. 33 is diagram showing the construction of an A/D converter according to a 13th embodiment of the invention.

Specifically, according to this embodiment, the first A/D converter 561 in FIG. 38 is constructed as illustrated in FIG. 33.

As shown in FIG. 33, the first converter includes an analog signal input terminal 521, reference-voltage input terminals 522a, 522b, a resistor-element connecting circuit 523 for equally potential-dividing a reference voltage into eight steps, a comparator 524 for comparing the signal voltage of the analog input with the reference voltages obtained by the equal potential division performed by the resistor-element connecting circuit 523, an encoder 525 for obtaining the average (majority) of the outputs from the comparator 524, a logic circuit 526 for obtaining a digital output code based upon the averaged output of the comparator, and a digital output terminal 527.

The operation of the A/D converter shown in FIG. 33 will now be described.

The comparator 524 for comparing the analog input voltage with the reference voltages of eight steps obtained by potential division is composed of five parallel-connected comparators for each reference voltage. This means that these parallel-connected comparators output five results representing the comparison between the respective reference voltage and the input voltage.

Owing to a variance in comparator characteristics, there are cases in which these five outputs contain different results even though they are produced for the same reference voltage. However, since larger results of comparison are selected by the encoder or averaging (majority) circuit 525, the error attributed to comparator variance can be reduced. This makes it possible to improve the conversion characteristic of the n-number of higher-order bits and improve overall linearity.

(14th Embodiment)

A 14h embodiment of the present invention will now be described in detail with reference to FIG. 34. The 14th embodiment is a modification of the 13th embodiment shown in FIG. 33. Portions similar to those shown in FIG. 33 are designated by like reference numerals and need not be described again.

Figure 34:
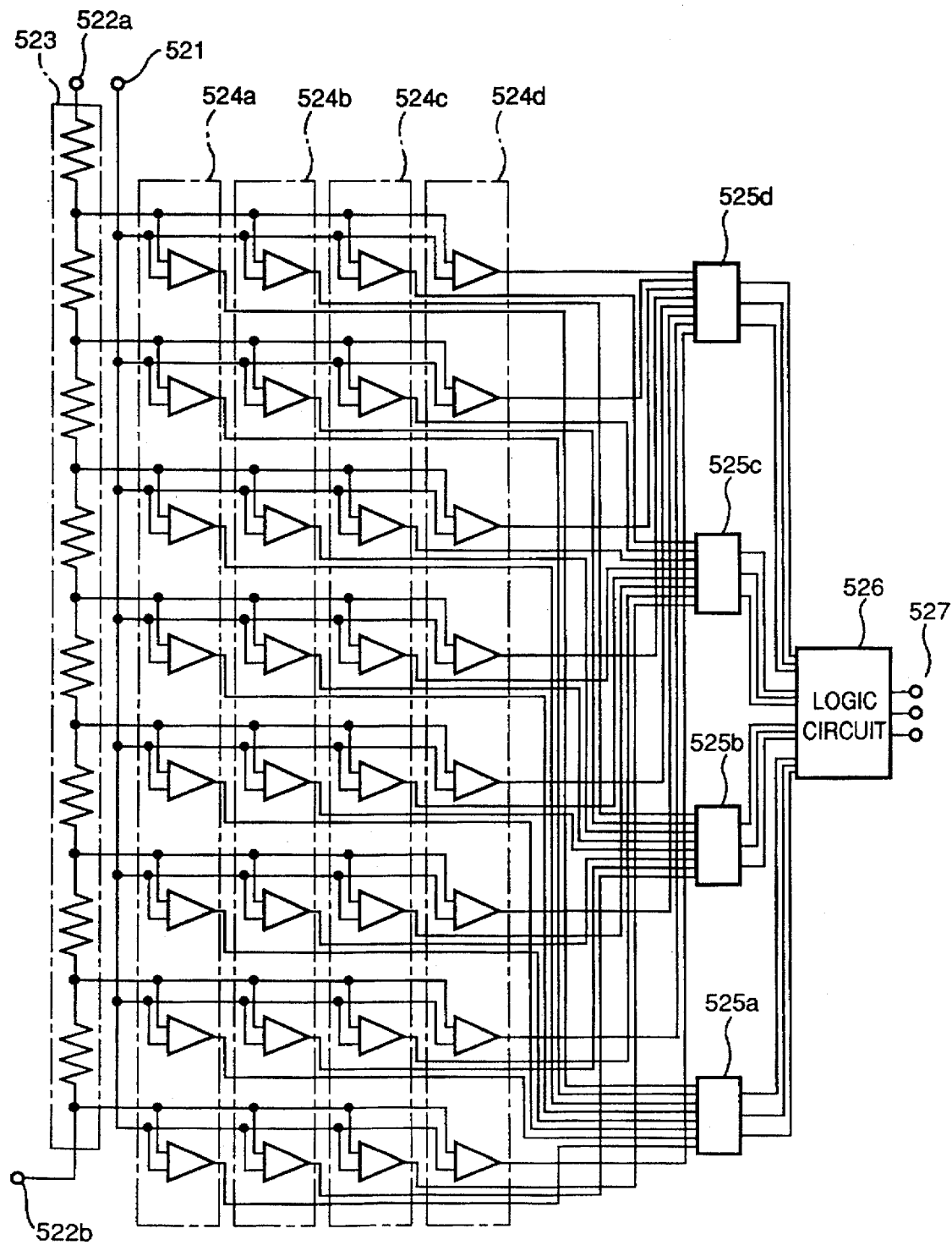
FIG. 34 is diagram showing the construction of an A/D converter according to a 14th embodiment of the invention.

In FIG. 34, numeral 524a denotes a first comparator group, 524b a second comparator group, 524c a third comparator group, and 524d a fourth comparator group. Further, numeral 525a denotes a first decoder for outputting a first decoded value based upon the outputs of the first comparator group 524a, 525b a second decoder for outputting a second decoded value based upon the outputs of the second comparator group 524b, 525c a third decoder for outputting a third decoded value based upon the outputs of the third comparator group 524c, and 525d a fourth decoder for outputting a fourth decoded value based upon the outputs of the fourth comparator group 524d. Numeral 526 denotes a logic circuit for obtaining the average value of the first through fourth decoded values outputted by the first through fourth decoders 524a, 524b, 524c and 524d.

The operation of the circuit shown in FIG. 34 will now be described.

The comparator for comparing the analog input voltage with the reference voltages of eight steps obtained by potential division is composed of four parallel-connected comparators for each reference voltage. This means that these parallel-connected comparators output four results representing the comparison between the respective reference voltage and the input voltage.

Owing to a variance in comparator characteristics, there are cases in which these four outputted results differ even though they are produced for the same analog input voltage. In the arrangement of FIG. 34, however, the average value of the four decoded values produced based upon the four comparator outputs is obtained by the logic circuit 526. As a result, error ascribable to comparator variance can be greatly reduced. This makes it possible to improve overall linearity.

(15th Embodiment)

A 15th embodiment will now be described with reference to FIGS. 35 and 36.

As is well known, in an apparatus such as an image sensing apparatus, in which an optically formed image is converted into an electric signal that is then outputted to a picture tube, the non-linear light-emitting characteristic of the picture tube is taken into consideration to obtain a light-emitting state suited to human vision. In other words, non-linear processing referred to as a γ correction is executed as part of the signal processing in the image sensing apparatus in order to produce a light-emitting state suited to human vision.

Such γ correction processing is applied to the three primary-color R, G, B signals in a three device type video camera for business use. In a single device type video camera for private use, this processing is applied to the brightness signal and demodulated R, G, B signals. However, when the same γ correction is applied to a brightness signal and color signals, the comparatively dark signal of the color red in the final output image appears faded in comparison with the colors green and blue of the same brightness.

Figure 35:
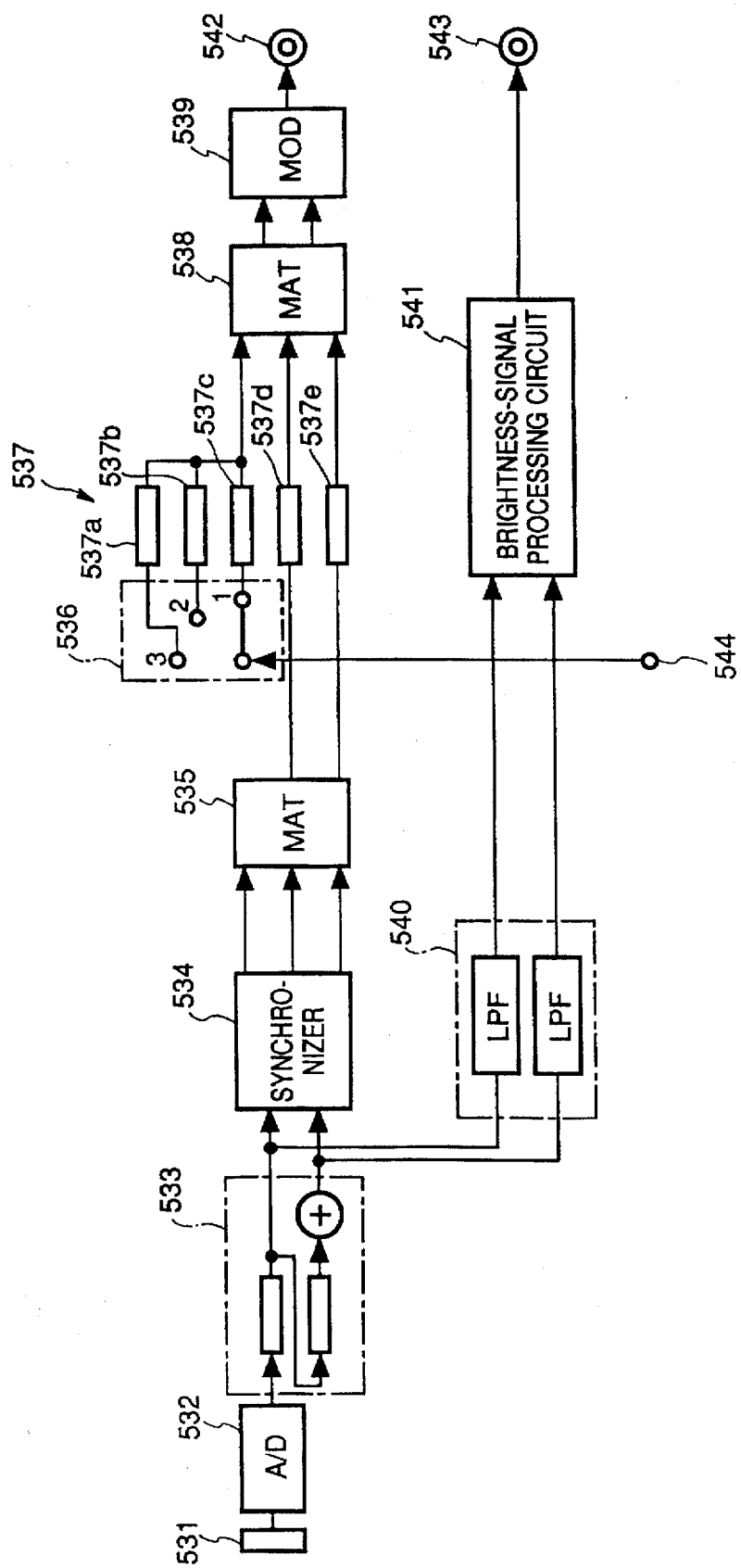
FIG. 35 is a block diagram illustrating the construction of an image sensing apparatus according to a 15th embodiment of the invention.

The present embodiment is adapted as shown in FIG. 35 in order to solve this problem.

As shown in FIG. 35, numeral 531 denotes a CCD image sensing element, 532 an A/D converter, 533 a 2 H delay line and 534 a synchronizing circuit for obtaining color information from a color carrier component contained in the CCD image sensing element 531.

Further, numeral 535 denotes a first matrix for generating demodulated R, G, B signals from the signal outputted by the synchronizing circuit 534, 536 a γ-conversion characteristic selecting switch for selecting a γ-conversion characteristic applied to the R signal, and 537 a ROM table storing γ characteristics, namely a first γ-conversion characteristic 537a for the R signal, a second γ-conversion characteristic 537b for the R signal, a third γ-conversion characteristic 537c for the R signal, a γ-conversion characteristic for the G signal and a γ-conversion characteristic 537e for the B signal.

Numeral 538 denotes a second matrix for generating color-difference signals R−Y, B−Y from the demodulated R, G, B signals that have been subjected to the γ conversion, 539 a modulating circuit for subjecting the color-difference signals R−Y, B−Y to orthogonal modulation to obtain a chroma signal, 540 a low-pass filter for suppressing the color carrier component contained in the CCD signal outputted by the 2 H delay line 533, 541 a brightness-signal processing circuit for generating a wide-band brightness signal $Y_H$ from the CCD signal whose color carrier has been suppressed, 542 a chroma-signal output terminal, 543 a terminal for outputting the wide-band brightness signal, and 544 a mode-signal input circuit for controlling the changeover of the switch 536.

Figure 36:
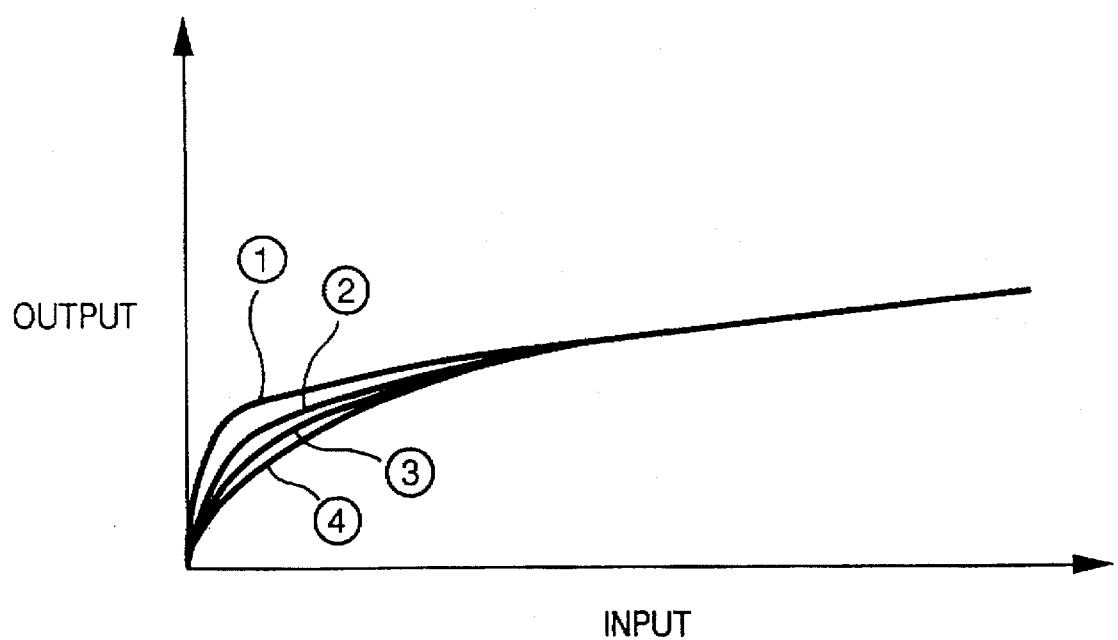
FIG. 36 is a curve characteristic diagram showing a γ-conversion characteristic according to the 15th embodiment.

FIG. 36 shows curves representing the γ-conversion characteristics stored in the ROM table 537 of FIG. 35.

The operation of this embodiment will now be described.

First, with regard to the demodulated R, G, B signals produced by the first matrix 535 of FIG. 35, the G and B signals are subjected to the γ conversion represented by the γ curve ④ in FIG. 36 by the ROM tables 537d, 537e.

As for the R signal, one of the ROM tables 537a, 537b, 537c, namely one of the γ curves ①, ②, ③ of FIG. 36, is selected based upon the mode signal applied to the mode-signal input terminal 544 of FIG. 35. The R signal is subjected to the γ conversion using the characteristic selected.

Since the γ curves ①, ②, ③ in FIG. 36 have higher values than the γ curve 4 in the region of low illuminance, the red color component can be emphasized in comparison with the green and blue color components if the brightness level is low.

(16th Embodiment)

A 16th embodiment of the invention will now be described in accordance with FIG. 37. Portions identical with those shown in FIG. 35 are designated by like reference numerals and need not be described again.

Figure 37:
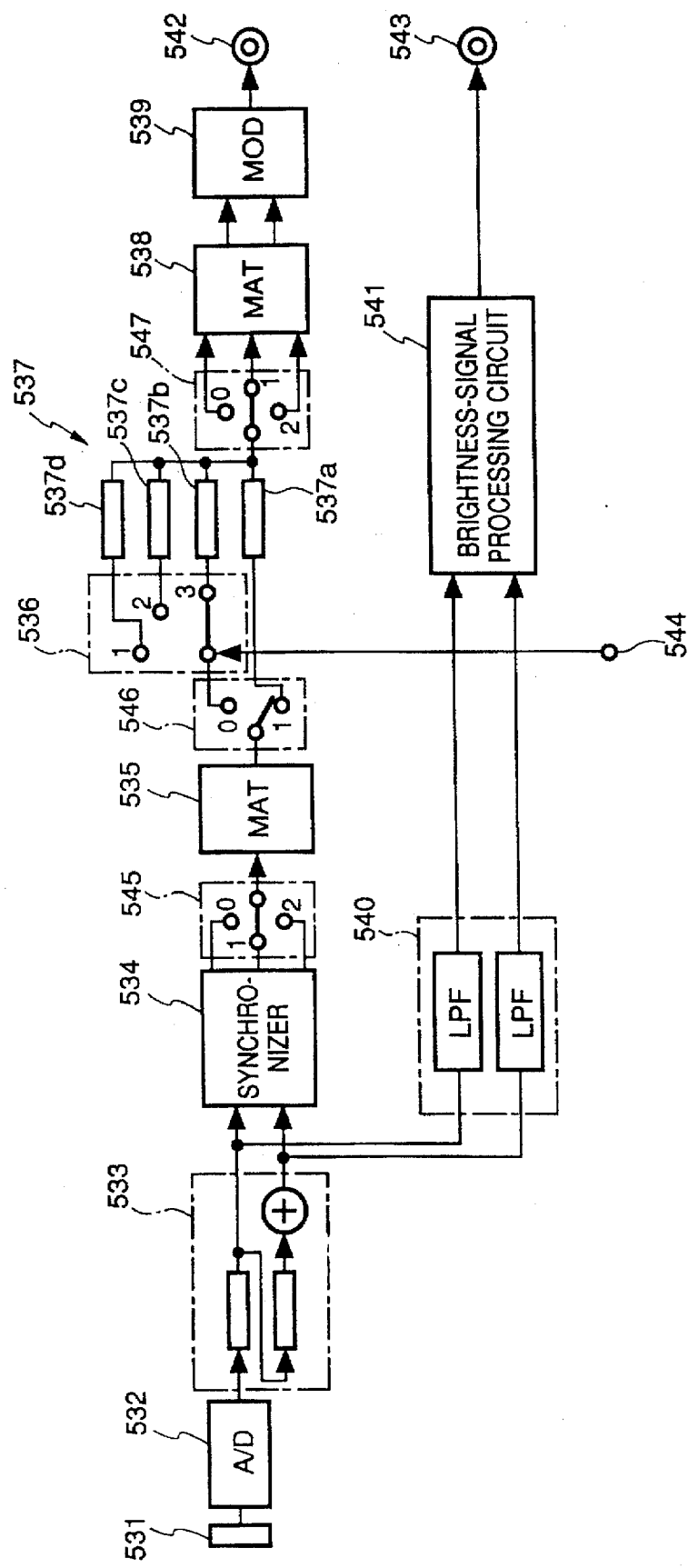
FIG. 37 is a block diagram illustrating the construction of an image sensing apparatus according to a 16th embodiment of the invention.

In the 16th embodiment as shown in FIG. 37, a first switch 545 is provided between the synchronizing circuit 534 and the first matrix 535, and a second switch 546 is provided between the first matrix 535 and the γ-conversion characteristic selecting switch 536. Further, a third switch 547 is provided between the ROM table 537 and the second matrix 538.

In the circuit of this embodiment as thus constructed, the signal from the CCD image sensing element 531 is digitally converted by the A/D converter 532, after which the digital signal is applied to the synchronizing circuit 534 via the 2H delay line 533. The synchronizing circuit 534 separates the digital signal into $Y_L$, $C_R$, $C_B$ signals and applies these signals to the first switch 545.

The first switch 545 is changed over in the order 0, 1, 2, 0, 1, 2 . . . at a frequency of 14.3 MHz. As a result, dot-sequential signals $Y_L/C_R/C_B/Y_L/C_R/C_B$ . . . enter the first matrix 535 and demodulated R, G, B signals are produced in a dot sequence R/G/B/R/G/B.

The second switch 546 is changed over in the order 0/1/1/0/1/1 . . . in synchronism with the arrival of the dot-sequential demodulated R, G, B signals in the order 0/1/1/0/1/1. As a result, only the R signal is applied to the γ-conversion characteristic selecting switch 536. Further, the G and B signals are applied to the first ROM table 537a.

The γ-conversion characteristic selecting switch 536 is connected to any one of fixed terminals 1, 2, 3 by a control signal applied to a control-signal input terminal 544. As a consequence, the R signal sent to the γ-conversion characteristic selecting switch 536 is subjected to the γ conversion by any one of the γ-conversion characteristics that have been stored in the respective ROM tables 537b, 537c, 537d.

The G and B signals are subjected to the γ conversion by the γ-conversion characteristic stored in the ROM table 537a. The γ characteristics represented by the γ curves ④, ③, ②, ① of FIG. 36 are stored in the ROM tables 537a, 537b, 537c, 537d, respectively.

Accordingly, in a case where the brightness level of the video signal incident upon the CCD image sensing element 531 is low, the red color component is emphasized in comparison with components of the colors green and blue. The γ-converted dot-sequential R, G, B signals are restored to parallel demodulated R, G, B signals by the third switch 547, after which the chroma signal is obtained via the second matrix 538 and modulating circuit 539. The chroma signal is outputted by the chroma-signal output terminal 542.

In accordance with the 11th and 12th embodiments as described above, the output range of an A/D converter can be utilized effectively and a video signal with an excellent S/N ratio can be provided without increasing the number of bits of the A/D converter. Further, if this is compared with a great increase in the number of comparators brought about when the number of bits of the A/D converter is increased, the invention can be realized by a very small amount of circuitry.

In accordance with the 13th and 14th embodiments, the invention is applied to a two-step parallel-type A/D converter, thereby making it possible to improve the conversion characteristic of n-number of higher-order bits as well as overall linearity.

In accordance with the 15th and 16th embodiments, the red signal in a video signal is subjected to a γ correction having an elevated dark portion. This makes it possible to suppress fading of the color red in comparison with the colors green and blue.

The present invention is not limited to the above embodiments and various changes and modifications can be made within the spirit and scope of the present invention. Therefore, to apprise the public of the scope of the present invention, the following claims are made.

What is claimed is:

1. An image sensing apparatus comprising:

an image sensing element for converting an optical image into an electric image pick-up signal and outputting the image pick-up signal;

an A/D converter for converting the image pick-up signal outputted by said image sensing element into a digital signal;

level detecting means for detecting a level of the image pick-up signal outputted by said A/D converter;

adjusting an means for adjusting amount of light incident upon said image sensing element in dependence upon the level detected by said level detecting means;

γ-knee converting means having a plurality of conversion characteristics for applying non-linear processing to the image pick-up signal outputted by said image sensing element; and selecting at least means for selecting one of the plurality of γ-knee characteristics in dependence upon the output signal level of said A/D converter.

2. The apparatus according to claim 1, wherein when the output signal level of said A/D converter is detected to be low by said detecting means, said selecting means selects a γ-knee characteristic in such a manner that a major portion of an output range of said A/D converter is allocated to the γ characteristic and said adjusting means increases the amount of light incident upon said image sensing element, and when the output signal level of said A/D converter is detected to be high by said detecting means, said selecting means selects a γ-knee characteristic in such a manner that a minor portion of the output range of said A/D converter is allocated to the γ characteristic and said adjusting means decreases the amount of light incident upon said image sensing element.

3. An image sensing apparatus for converting an optically formed image into an electric signal, comprising:

means for generating a video signal, which has color information, from the photoelectrically-converted image pick-up signal; and means for subjecting the video signal having the color information to a non-linear conversion in which a light-emitting state of a picture tube is rendered appropriate in terms of vision, wherein the non-linear conversion is applied in such a manner that a color component representing the color red in the video signal having the color information is emphasized in comparison with other color components in the video signal as long as a brightness level lies within a prescribed range.

4. An image sensing apparatus comprising:

an image sensing element for converting an optical image into an electric image pick-up signal and outputting the image pick-up signal;

an A/D converter for converting the image pick-up signal outputted by said image sensing element into a digital signal;

level detecting means for detecting a level of the image pick-up signal outputted by said A/D converter;

adjusting means for adjusting an amount of light incident upon said image sensing element in dependence upon the level detected by said level detecting means;

non-linear converting means having a plurality of conversion characteristics for applying non-linear processing to the image pick-up signal outputted by said image sensing element; and selecting means for selecting at least one of the plurality of non-linear characteristics in dependence upon the output signal level of said A/D converter.

5. Apparatus according to claim 4, wherein said non-linear characteristics comprise γ-knee characteristics.

6. Apparatus according to claim 5, wherein when the output signal level of said A/D converter is detected to be low by said detecting means, said selecting means selects a γ-knee characteristic in such a manner that a major portion of an output range of said A/D converter is allocated to the γ characteristic and said adjusting means increases the amount of light incident upon said image sensing element, and when the output signal level of said A/D converter is detected to be high by said detecting means, said selecting means selects a γ-knee characteristic in such a manner that a minor portion of the output range of said A/D converter is allocated to the γ characteristic and said adjusting means decreases the amount of light incident upon said image sensing element.

* * * * *

UNITED STATES PATENT AND TRADEMARK OFFICE
CERTIFICATE OF CORRECTION

PATENT NO. : 5,691,821
DATED : November 25, 1997
INVENTOR(S) : TERUO HIEDA, ET AL.

It is certified that error appears in the above-identified patent and that said Letters Patent is hereby corrected as shown below:

<u>Column 2</u>

Line 12, "the" should read --in the--.

<u>Column 22</u>

Line 35, "an" should be deleted and, "adjusting" (second occurrence) should read --adjusting an--.

Line 42, "at least" should be deleted and, "selecting" (second occurrence) should read --selecting at least--.

Signed and Sealed this

Twelfth Day of May, 1998

Attest:

BRUCE LEHMAN

*Attesting Officer*  *Commissioner of Patents and Trademarks*